United States Patent [19]

Zinn et al.

[11] Patent Number: 4,909,731
[45] Date of Patent: Mar. 20, 1990

[54] METHOD AND APPARATUS FOR CONDUCTING A PROCESS IN A PULSATING ENVIRONMENT

[75] Inventors: Ben T. Zinn, Atlanta; Brady R. Daniel, Stone Mountain; Andrew B. Rabhan, Atlanta, all of Ga.

[73] Assignee: Sonotech, Inc., Atlanta, Ga.

[21] Appl. No.: 227,900

[22] Filed: Aug. 3, 1988

Related U.S. Application Data

[60] Continuation-in-part of Ser. No. 75,065, Jul. 17, 1987, Pat. No. 4,770,626, which is a division of Ser. No. 836,997, Mar. 6, 1986, Pat. No. 4,699,588.

[51] Int. Cl.$^4$ .................. F27B 15/00; F27D 7/00; F23C 11/04
[52] U.S. Cl. .................................. 432/58; 122/24; 431/1
[58] Field of Search ............. 431/1, 114; 432/58; 122/24

[56] References Cited

U.S. PATENT DOCUMENTS

3,276,505  10/1966  Huber et al. ................. 431/1
4,640,674   2/1987  Kitchen ...................... 431/1

OTHER PUBLICATIONS

Keller, et al., Sandia Report, *Pulse Combustion: Demonstration of the Characteristic Mixing Time in a Commercial Burner*, (Apr. 1989); pp. 6, 12 (note 32), 14.
Heitor et al., "*Influence of Confinement on Combustion Instabilities of Premixed Flames Stabilized on Axisymmetric Baffles*", Combustion and Flame 57: 109–121 (1984).
Campbell et al., "*Combustion Oscillations in a Ducted Premixed Flame*", source and year unknown (believed to be 1983).
Katsuki et al., "*The Influence of Duct Geometry on Unsteady Premixed Flames*", AIAA 19th Fluid Dynamics, Combustion and flame 63: 87–94 (1986).
Schadow et al., "*Large-Scale Coherent Structures as Drivers of Combustion Instability*", Plasma Dynamics and Lasers Conference, Jun. 8–10, 1987/Honolulu, Hi.
Sivasegaram et al., "*Oscillations in Non-Axisymmetric Dump Combustors*", Imperial College of Science & Technology, Fluids Section, Dept. of Mech. Engineering, Exhibition Road, London SW7 2BX, England, Oct. 1987.
Sivasegaram et al., "*Oscillations in Axisymmetric Dump Combustors*", Imperial College of Science & Technology, Fluids Section, Dept. of Mech. Engineering, Exhibition Road, London SW7 2BX, England, Jul. 1986 (believed to have appeared in Combustion and Flame Magazine, date unknown but probably after 1986).
Bray et al., "*An Investigation of Reheat Buzz Instabilities*", University of Southampton, England, Feb., 1983 (believed to be an internal report at the University; unknown whether or not published).
Wilson et al., "*Enhancement of Mixing in ducted Flows by Acoustic Excitation*", source unknown, date believed to be Sep. 1984 (unknown whether or not published).
Sivasegaram et al., "*Suppression of Oscillations in Confined disk–Stabilized Flames*", J. Propulsion, vol. 3, No. 4, Jul.–Aug. 1987.

*Primary Examiner*—Edward G. Favors
*Attorney, Agent, or Firm*—Jones, Askew & Lunsford

[57] ABSTRACT

An improved flame holder based tunable pulse combustor, and a processing system employing same. The processing system is for thermal, chemical, and physical processes which employ natural acoustic modes in a processing chamber to enhance the processing. An acoustically resonant processing chamber is provided as the processing vessel. A frequency tunable pulse combustor comprising a flame holder is positioned to excite natural acoustic modes in the processing chamber. Material introduced into the processing chamber is thereby subjected to acoustic pulsations while the material is being processed. The acoustic excitations in the system result in improved moisture removal and particle heating. Also disclosed are various embodiments of frequency and amplitude tunable pulse combustors which may be employed to excite the natural acoustic modes in the processing chamber, including axially translatable acoustic decoupler and flame holder configurations.

46 Claims, 15 Drawing Sheets

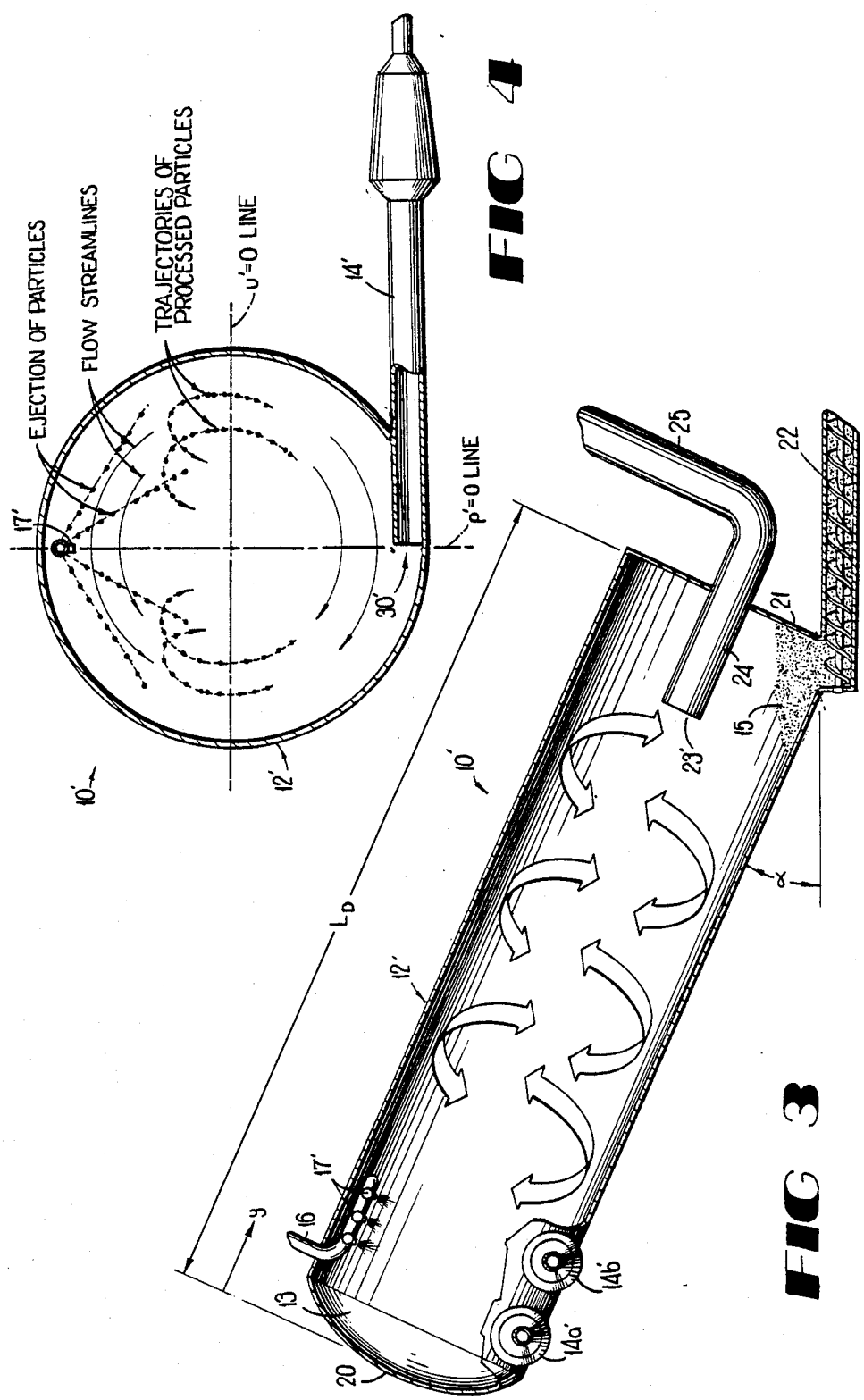

PURELY RADIAL MODES
(FIRST)

$S_{0,1} = 3.8317$

PURELY RADIAL MODES
(SECOND)

$S_{0,2} = 7.0156$

FIRST LONGITUDINAL MODE

SECOND LONGITUDINAL MODE

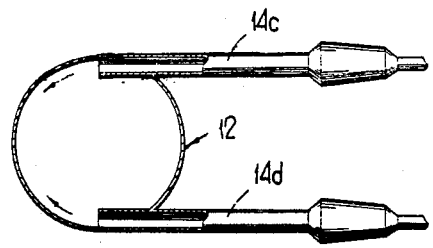
COMBUSTORS 'IN-PHASE'
FIG 9
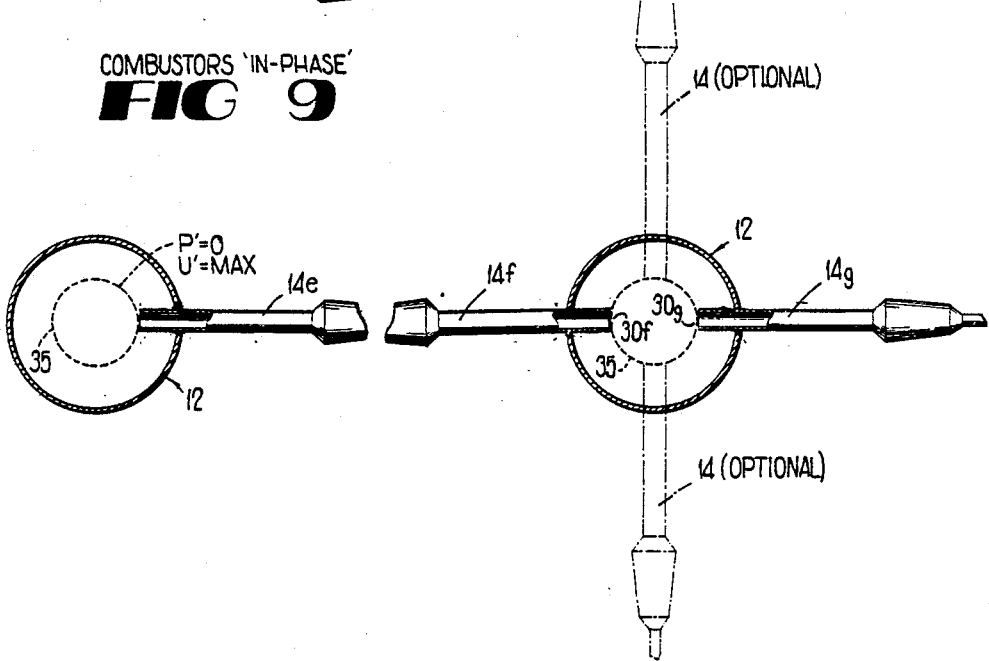
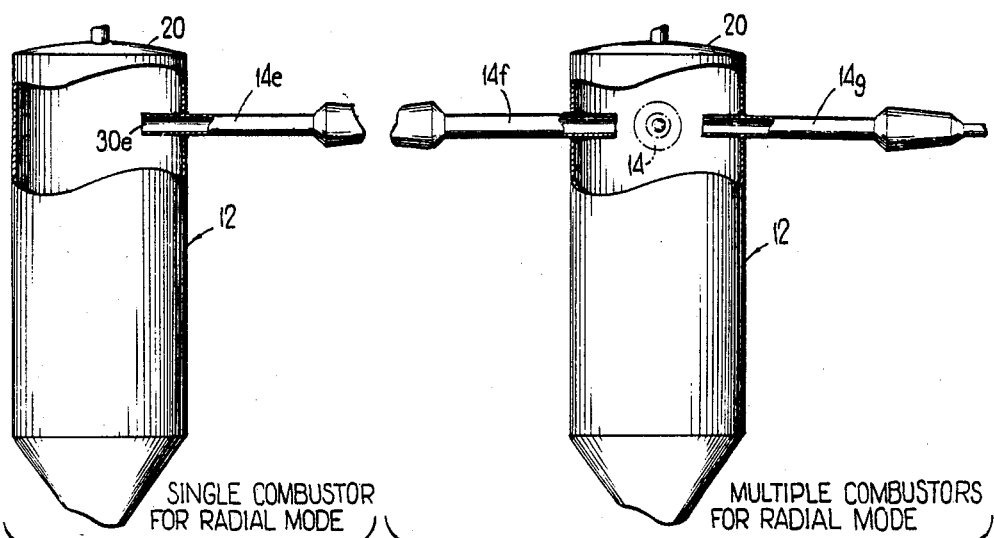
SINGLE COMBUSTOR FOR RADIAL MODE
FIG 10A
MULTIPLE COMBUSTORS FOR RADIAL MODE
FIG 10B

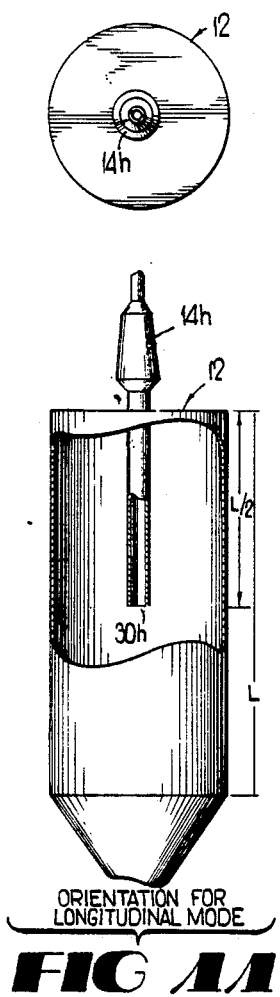
FIG. AA

METHOD AND APPARATUS FOR CONDUCTING A PROCESS IN A PULSATING ENVIRONMENT

CROSS REFERENCE TO RELATED APPLICATION

This is a continuation-in-part of U.S. Pat. application Ser. No. 075,065 filed July 17, 1987, Pat. No. 4,770,626 which is a divisional of U.S. Pat. application Ser. No. 836,997 filed Mar. 6, 1986, which issued on Oct. 13, 1987 as U.S. Pat. No. 4,699,588.

TECHNICAL FIELD

The present invention relates generally to pulse combustion and acoustics, and more specifically to a use of natural acoustic modes in a processing chamber induced by pulsating sources such as tunable pulse combustors, oscillatory combustion in shear layers, fuel modulation and the like, to enhance a chemical, a thermal or a physical process. The present invention particularly relates to an improved, tunable pulse combustor apparatus which can be used as an acoustic excitation means.

BACKGROUND OF THE INVENTION

In many industrial chemical, thermal and physical processing systems, burners are used to produce gas streams having specific temperatures and compositions for a variety of applications involving momentum, heat and/or mass transfer processes. The costs of many of these material processing applications could be reduced if practical means for enhancing the rates of momentum, heat and mass transfer could be found. There is evidence in the prior art that the presence of pulsations in a gas flow results in large increases in the rates of momentum, heat and mass transfer processes.

Pulse combustors are known in the art as highly efficient sources of high temperature pulsating gas streams for heaters, boilers, and the like. Consequently, operational and capital investment costs of many industrial processes could be reduced if steady state burners commonly employed in such systems were replaced by pulse combustors which produce pulsating flows having the required thermal loads, temperature and compositions.

However, prior to the present invention pulse combustors were not optimally used in various industrial processes such as drying, calcining, heating and the like. Furthermore, prior to the present invention it has not been believed that pulse combustors could be designed to possess large turndown ratios, operate efficiently over wide ranges of fuel/air ratios and possess capabilities for controlling the amplitudes and frequencies of their pulsations. For example, in one prior art pulse dryer presently used for drying a slurry of kaolin, the slurry of material to be dried is injected directly into the tail pipe of a pulse combustor a short distance upstream of the pulse combustor exit plane. Upon leaving the pulse combustor, the pulsating flow and injected material enter a primary cyclone or drying chamber. The injection of material into the combustor tail pipe interferes with the combustor operation by adversely affecting its acoustic characteristics. This, in turn, limits the amount of material which can be dried and worsens the combustion process by decreasing the combustor capacity to ingest combustion air and achieve adequate mixing between the fuel and air. This results in incomplete combustion and undesirable soot formation in the combustor which adversely affects the properties of dried material, such as kaolin. Moreover, in this system the pulsations from the pulse combustor are damped out in the drying chamber, and no advantage whatsoever is taken of the natural acoustic characteristics of the drying chamber.

Other prior art material drying systems are known to use pulse combustors. In U.S. Pat. No. 3,618,655 to Lockwood, a paste of slurry of material to be dried is introduced into the exhaust pipe of a pulse jet engine, and the partly dried particles are then dispensed into a tank having vortices of gas at a substantially lower temperature than that found in the pulse jet exhaust. This structure is similar to the above-described kaolin drying system, and also appears unconcerned with the natural acoustic characteristics of the drying volume. In addition, there is a risk of overheating (with resultant burning of organic materials such as food products) in this type system, since the material is injected directly into the hot gas flow. Also, the system uses self aspirating pulse combustors which have limited ranges of operating conditions.

It is also known in the art to synchronize an oscillation-radiation chamber of a furnace with a pulsating combustion chamber. For example, in the papers of F. H. Reynst, there is described a system which employs a plurality of pulse combustors to excite a longitudinal acoustic mode inside a furnace chamber. By increasing or shortening the length of the oscillating column in the pulse combustors, the frequency is altered, thereby altering the oscillation induced in the radiation chamber. This system, however, appears limited to excitation of longitudinal acoustic modes in the furnace chamber. Moreover, the problems encountered in material processing environments, such as temperature, composition and moisture control and material drying time which are critical in, for example, dryers and calciners, are not considered in Reynst's writings.

It is also known in the art that transverse or "sloshing" type acoustic oscillations can be excited in cylindrical chambers and combustors. For example, the phenomenon of transverse oscillations was observed in studies of transverse instabilities in liquid fuel rocket motors.

It is also known in the art that undesirable acoustic oscillations, generally known as combustion instabilities, can be excited in ramjets, jet engine afterburners, solid propellant rocket motors and other propulsion systems by combustion processes inside shear layers which form downstream of flame holders, corners and mechanical obstacles. In studies directed towards the elimination of these undesirable combustion instabilities by, for example, Schadow and coworkers and Heitor et al., it has been shown that these instabilities are caused by interactions between vortex shedding at the origin of the shear layer, acoustic motions inside the propulsive device and unsteady combustion within vortices which are convected by the flow inside the shear layer. In all of these studies the investigated acoustic oscillations were restricted to the combustor under study and no teachings were provided as to how such pulsations can be used to improve industrial processes.

Prior to the present invention, however, there has been no attempt to utilize unsteady combustion processes inside shear layers, similar to those which excite undesirable combustion instabilities in propulsion systems, to excite flow pulsations within a processing chamber which will improve the rates of mass, momentum and heat transfer between the processed material and processing medium. Also, there has been no successful teaching that natural acoustic modes can be excited in a volume or system, such as a processing chamber, located downstream of the shear layer combustion region by an interaction between the acoustic mode oscillations excited inside the downstream volume and unsteady combustion within the shear layer. Also, prior to the present invention, there has been no teaching in the literature on how to construct pulse combustors which utilize unsteady combustion inside one or more shear layers to excite flow pulsations, and how to utilize such combustors to excite different acoustic mode oscillations in a processing chamber to which they are attached.

SUMMARY OF THE INVENTION

The present invention overcomes the above-described and other problems in prior art material and other processing systems by taking advantage of the natural acoustic modes of a processing chamber. Briefly described, the present invention comprises an improved pulsating material processing system which employs natural acoustic modes of a processing chamber to enhance the processing of the material by improving the rates of heating, mixing and mass transfer, temperature control, moisture control, composition control, and control of material drying time. The present invention is useful in both chemical, thermal and physical material processing systems, such as calciners, industrial dryers, boilers, furnaces, ovens and the like.

In preferred embodiments of the present invention, an acoustically resonant processing chamber is provided for processing material introduced into the processing chamber. A pulse combustor is provided for introducing a flow of heated gases into the processing chamber to process material introduced into the processing chamber. If necessary, cold dilution air is added to control the processing chamber temperature. Finally, means for exciting at least one natural acoustic mode in the processing chamber is provided so that material introduced into the processing chamber is subjected to acoustic pulsations while the material is being processed. Advantageously, the rates of heat, mass, and momentum transfer to and from the material are improved by the subjection of the processed material to these acoustic pulsations.

More particularly described, in the present invention, particular acoustic modes such as longitudinal, tangential, radial, tangential-radial, and three-dimensional modes are selectively excited by selective positioning of an acoustic exciter which is frequency tunable. These modes, which may include any longitudinal, transverse or three-dimensional mode of the processing system, may be selected in order to optimize certain parameters of the process such as drying or chemical reaction rates or to increase the length of the path of travel of material in the processing chamber. In the preferred embodiments, the frequency tunable acoustic exciter is a tunable pulse combustor, although other equally suitable exciting means are disclosed.

For many applications to derive maximum benefit from these acoustic oscillations, the acoustic exciter must be tuned to one or more of the natural acoustic modes of the processing chamber. Various configurations for tuning to these natural acoustic modes are provided. In the various embodiments disclosed, the tuning of the processing chamber is effectuated by the interaction between the natural acoustic mode oscillations in the processing chamber and the unsteady combustion processes inside one or more shear layers, such as the shear layers which form downstream of a circular disc flame holder, a conical flame holder, a rod flame holder, a ring flame holder, a combination of ring and rod flame holders, corner flame holders and the like. Tuning is also effectuated by interaction between unsteady combustion processes in the shear layer and acoustic modes oscillations in both the processing chamber and in the region upstream of the flame holder. Tuning is also effectuated by positioning the flame holder at different locations within the combustor, by selection of flame holder and combustor sizes, and by positioning of the flame holder within the processing chamber. Also, a combination of flame holders, placed in different positions within the combustor and/or the processing chamber can be employed to control the frequency and amplitude of the excited processing chamber pulsations.

Still more particularly described, a plurality of frequency-tunable pulse combustors are employed to excite the acoustic mode oscillations in the processing chamber. These pulse combustors are mounted in particular geometric arrays to excite longitudinal, transverse or three-dimensional oscillations. One preferred frequency tunable pulse combustor comprises a combustor tube which includes a flame holding device and a shear layer region which forms downstream of the flame holder. Unsteady reaction of fuel and air occurs within convected vortices inside the shear layer region. The unsteady combustion produces unsteady heat release and unsteady gas expansion which excite acoustic mode oscillations inside the combustor and the processing chamber. Yet another preferred combustor embodiment comprises a combustor tube which includes a flame holding device and a shear layer wherein reaction of fuel and air occurs and heat is released within the shear layer which excites one or more natural acoustic modes within the processing chamber only. In most configurations, an air intake supplies combustion air into the combustion zone for reaction, and fuel injectors supply fuel into the combustion zone. Hot gases are exhausted from the combustor tube by exhaust means. The frequency of pulsating combustion is controlled by altering the flame holder (such as its position or size), the acoustic characteristics of the combustor, or both, so as to provide a selectively variable or tunable frequency of pulsating combustion.

Various means are disclosed for altering the acoustic characteristics of the combustor tube. In one disclosed embodiment, the combustor tube comprises an axially translatable interfitting sleeve which is moved to alter the length of the combustor tube. In another embodiment the back wall of the combustor translates axially, thereby also affecting the length of the combustor tube. In another embodiment, one of the fuel injectors is axially translatable, and is adjusted to position the combustion zone to excite pulsations with a desired frequency in the combustor. In another embodiment, the flame holder is axially translatable, and is adjusted to position the combustion zone to excite pulsations with a given frequency. In yet another embodiment, the size of flame holder is changed to excite pulsations with a desired frequency. In yet another embodiment, the geometry of the flame holder is changed to excite pulsations with a given frequency. In yet another embodiment, several flame holders are used to excite pulsations of a given frequency. Advantageously, the use of the tunable pulse combustors to excite one or more natural acoustic resonances in the processing chamber combines the functions of an energy source and a sound excitation means within a single device.

Other embodiments of the tunable pulse combustor include fuel or air flow modulation for providing fuel or air to the combustion zone at a selectively variable frequency and the provision of primary and secondary fuel or air supplies to the combustion zone, one modulated and one unmodulated.

Yet still more particularly described, the acoustic modes excited in the processing chamber include its natural longitudinal, transverse and three-dimensional acoustic modes. Longitudinal modes include modes wherein oscillations occur along the axis of the processing chamber and the properties of the oscillations are uniform at each axial location. Transverse modes include the radial modes, wherein oscillations occur about a geometric center and along radii of a cylindrical processing chamber, as well as tangential modes, wherein oscillations occur in a "sloshing" or circumferential manner along specific paths in the transverse plane of a cylindrical processing chamber, and tangential-radial modes wherein oscillations occur along both radial and the specific paths of the tangential mode in the transverse plane of a cylindrical processing chamber. Three-dimensional mode oscillations include oscillations consisting of a combination of motions exhibited by one of the longitudinal and one of the transverse modes. Advantageously, arrangements of the acoustic exciting means in a particular predetermined array and operating them at a specific frequency can excite any desired mode, or a plurality of modes simultaneously, such as simultaneous excitation of a transverse and a longitudinal mode. Material subjected to the oscillations experiences a high degree of acoustic excitation which controls particle and gaseous dispersion as well as heat, mass and momentum transfer to and from the material.

Accordingly, it is an object of the present invention to provide a novel pulsating processing apparatus and method which utilizes the excitation of acoustic waves to improve heat, momentum and mass transfer processes, and increase process output and thermal efficiency.

It is another object of the present invention to reduce operating costs in a material processing system by enhancing the rates of heat, momentum and mass transfer.

It is another object of the present invention to provide improved pulse combustors and material processing systems which save energy due to increased efficiencies of operation.

It is another object of the present invention to provide an improved pulsating processing system which employs acoustic oscillations in a chemical, thermal, or physical material processing system to increase output of the process.

It is another object of the present invention to provide an improved pulsating processing system which includes means for selectively exciting acoustic modes in a processing system to take advantage of the natural acoustic modes of a processing chamber.

It is another object of the present invention to provide an improved slurry material dryer which utilizes longitudinal, transverse or three-dimensional acoustic oscillations in a drying chamber to promote and enhance drying.

It is a particular object of the present invention to provide an improved drying apparatus for color sensitive materials such as kaolin and organic materials such as food products and pharmaceuticals.

It is another object of the present invention to provide an improved pulse combustor with improved operational range.

It is another object of the present invention to provide an improved pulse combustor which is frequency tunable so that it may be successfully employed to excite various acoustic modes in furnaces or other processing chambers with which such combustors may be used.

It is another object of the present invention to provide an improved pulse combustor which is frequency tunable.

It is another object of this invention to provide an improved pulse combustor design which consists of a straight pipe and a flame holder.

It is another object of the present invention to provide an improved pulse combustor which possesses independent means to control the air and fuel flow rates, locations of air and fuel injection into the combustor, the location of the flame holder and the geometry of the flame holder, to enable optimization of the characteristics of the combustor, such as operation over wide ranges of fuel/air ratios and fuel inputs to control the energy content, composition, temperature, amplitude and frequency of pulsations of the combustor exhaust flow.

It is another object of the present invention to provide an improved industrial material processing system such as an industrial dryer which does not require injection of material to be dried into the exhaust flow of a pulse combustor, thereby undesirably affecting the operation of the pulse combustor.

It is another object of the present invention to provide an improved industrial material processing system such as an industrial dryer wherein the drying rate can be controlled by controlling the path length of material through the system with oscillatory movement of the material.

These and other objects, features, and advantages of the present invention may be more clearly understood and and appreciated from a review of the following detailed description of the disclosed embodiments and by reference to the appended drawings and claims.

BRIEF DESCRIPTION OF THE DRAWINGS

FIG. 3 is a schematic side view, in cross section, of another embodiment of a material processing system constructed in accordance with the present invention, wherein the processing chamber is operated at an angular inclination.

FIG. 4 is a schematic end view, in cross section of the embodiment of FIG. 3, illustrating the tumbling path or trajectories of material in the system.

FIG. 9 is another schematic end view, in cross section, of a cylindrical processing chamber illustrating placement of combustors or other acoustic exciting means to excite tangential and other acoustic modes.

FIG. 10, consisting of FIGS. 10A and 10B, comprises schematic end and side views, in cross section, of a cylindrical processing chamber illustrating placement of combustors or other acoustic exciting means to excite radial and other acoustic modes.

FIG. 11 comprises schematic end and side views, partly in cross section, of a cylindrical processing chamber illustrating placement of combustors or other acoustic exciting means to excite longitudinal and other oscillations.

DETAILED DESCRIPTIONS OF THE PREFERRED EMBODIMENTS

Figure 1:
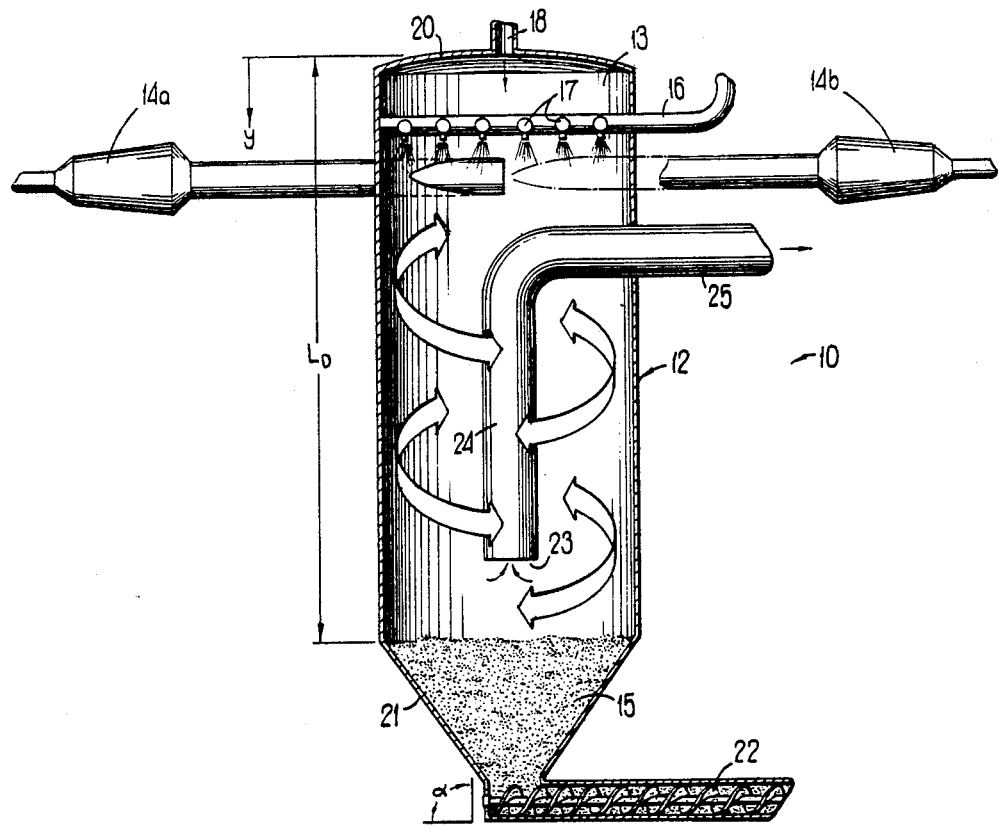
FIG. 1 is a schematic side view, in cross section, of a material processing system according to a preferred embodiment of the present invention, wherein a pair of tunable pulse combustors are employed to excite a tangential acoustic mode in a processing chamber.

Referring now to the drawings, in which like numerals indicate like elements throughout the several views, and more particularly to FIG. 1 thereof, a preferred embodiment of a material processing system 10 constructed in accordance with the present invention is illustrated. The system 10 includes a generally cylindrical processing chamber 12 and a pair of pulse combustors 14a, 14b connected at the upper end 13 to excite, for example, transverse oscillations in the processing chamber (see FIG. 2). In particular, the illustrated system 10 is a dryer apparatus adapted for drying a slurry of wet material, such as kaolin, introduced through a supply pipe 16 which is preferably aligned with an acoustic pressure nodal line and injected downwardly into the upper end 13 of the processing chamber 12 through a plurality of nozzles or valves 17. If required, dilution air may be introduced through a dilution air inlet 18 to reduce the temperature in the processing chamber to a desired level.

The processing chamber 12 also includes a closed top 20 and a frustoconical collection zone 21 wherein dried material 15 is deposited after experiencing acoustic pulsations throughout its residence time in the dryer. An auger-type removal system 22 is employed to remove the dried material 15 from the collection zone 21.

Generally, the exhaust means for the processing chamber should be positioned near pressure nodes of excited oscillations to minimize interference with the oscillations. Exhaust gases from the system 10 of the preferred embodiment therefore exit via a radially-extending exhaust port 25. The exhaust gases in the preferred embodiment are drawn into a port 23 by a negative pressure created by an exhaust fan (not illustrated), and thence into a longitudinally extending and axially positioned exhaust pipe 24. Exhaust gases drawn into the exhaust pipe 24 are vented from the processing chamber through the exhaust port 25 which directs the exhaust gases out of the system. The exhaust pipe 24 is therefore preferably positioned along an axis of the cylinder of the processing chamber 12 since the axis is closest to pressure nodes of tangential modes of oscillation, therefore only minimally interfering with the oscillations of these modes in the processing chamber.

As material is introduced into the top of the processing chamber 12, and falls downwardly through the processing chamber under the influence of gravity, the material experiences tangential acoustic pulsations in each horizontal plane in the dryer in the embodiment of FIG. 1. Advantageously, the material to be dried is not injected directly into the exhaust stream emanating from the pulse combustors 14a, 14b, and therefore do not interfere with the pulse combustor operation. The drying time of the material can be controlled by varying the dryer length L, inclination angle α of the dryer, and characteristics of excited pulsations.

The pulse combustors 14a, 14b in FIG. 1 are mounted to the processing chamber 12 so as to excite transverse acoustic oscillations in the processing chamber. As can best be seen in FIG. 2, the pulse combustors are operated as a tandem pair and are mounted to exhaust gases from exhaust region 30a, 30b of the combustors and along an interior circumference of the processing chamber 12. Pulse combustors 14a and 14b in FIG. 1 will also excite oscillations of longitudinal or three-dimensional modes of the processing chamber 12 when operated at the frequencies of these modes. It will therefore be understood that excitation of various acoustic modes is substantially frequency-sensitive.

FIG. 3 illustrates a second preferred embodiment 10' wherein the processing chamber 12' is placed at an angle α. In this embodiment, the pulse combustors 14a', 14b' are operated to impart a spiral, tumbling motion to material introduced into the system through injection valves 17', as shown in FIG. 4, which are positioned diametrically opposite the exhaust outlets 30' of the combustors 14'. The exhaust entry port 23' is positioned along an axis of processing chamber, aligned with the pressure nodes of the tangential acoustic modes.

The combined effects of gravity and pulsating tangential velocity oscillations in the angularly inclined processing chamber 12' will produce a "tumbling" spiral flow in the processing chamber. As shown in FIG. 4, the processed particles will be periodically urged along tangential paths inside the processing chamber by the oscillating gaseous flow from the combustors. This tangential movement will be followed by downward movement due to the influence of gravity. It is possible that some particles will remain suspended for periods of time near pressure antinodes. FIGS. 3 and 4 illustrate the resultant generally inwardly falling spiral paths of travel. This results in lengthening the travel path of the particles in the processing chamber and increasing their residence times in the processing chamber, thereby increasing the exposure time of the particles to the hot gases from the combustor.

It should be understood that various types of materials may be processed by use of the present invention—gases, solids, powders, liquids, and various combinations thereof. In addition, it should be understood that for many applications a preferred method of processing such material comprises the step of optimizing the processing of material in the system, particularly by tuning to a frequency which optimizes a particular parameter for a given process. For example, the optimized parameter can include the final temperature of the processed material, the final moisture content of the processed material, the amplitude of pulsations in the system to control noise level, the final chemical composition of the processed material, and other parameters.

Figure 12:
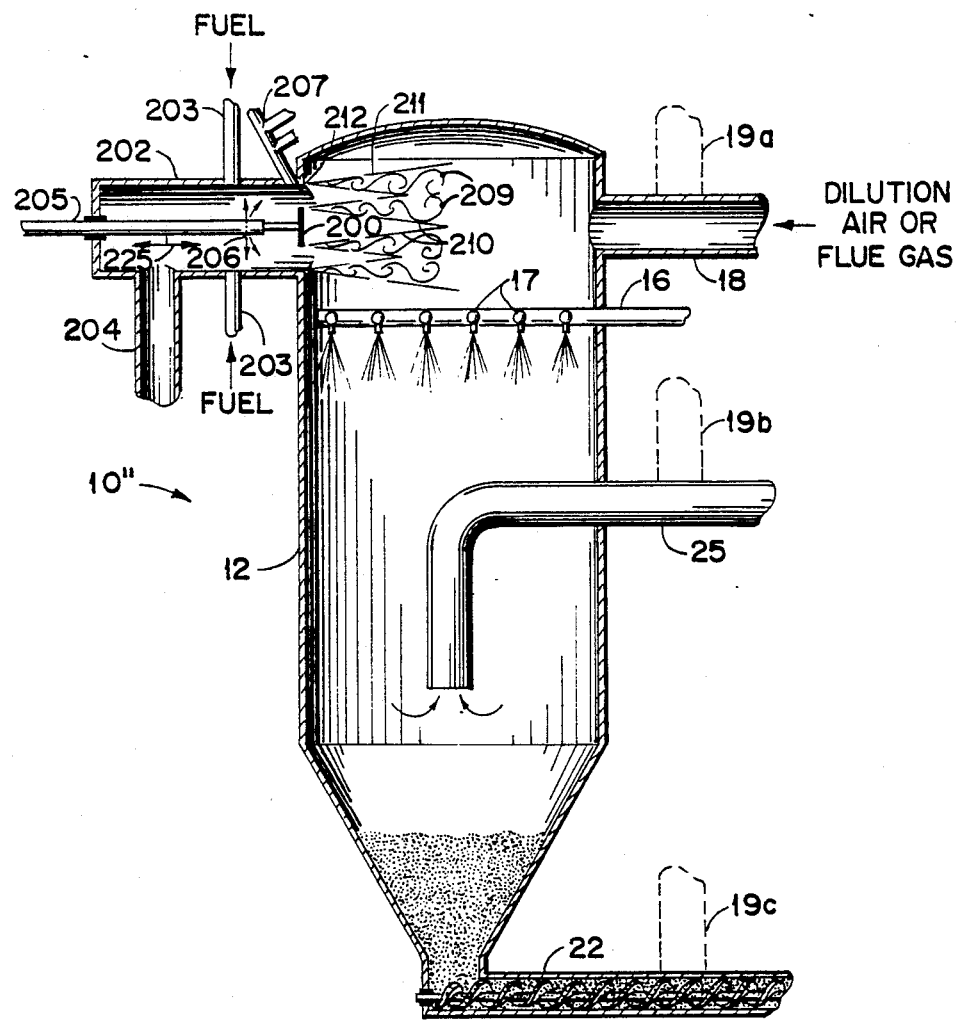
FIG. 12 is a schematic view, in cross section, of an alternate embodiment of the material processing system of FIG. 1, employing a short combustor and a disc type flame holder attached to a translatable rod used to excite acoustic mode oscillations inside the processing chamber.

A particular application contemplated for the processing system 10 of the present invention is the cleaning of flue gases from boilers, incinerators, combustors and the like. Referring to FIGS. 1 and 12, flue gases to be cleaned are supplied to the processing chamber through inlet 18. Reactants for cleaning the flue gas by chemical reactions are supplied through supply pipe 16 and injected into the processing chamber 12 through injectors 17. The tunable pulse combustors 14a and 14b excite pulsations within the processing chamber which enhance the rates of chemical reactions between the flue gases and the reactants.

In a specific application of such a system for cleaning flue gases, sulfur dioxide ($SO_2$) are removed from the flue gases in the processing chamber 12. In this case the reactants comprise a mixture of lime or dolomite and water, or other suitable chemical reactants for flue gas, which upon injection into the processing chamber 12 will react with the flue gases introduced through the inlet 18 and remove all or most of sulfur dioxide. Any particulates generated in these reactions such as powder are collected as dried material 15 and removed by auger 22 or other material removing means. The cleaned flue gases are removed through the exhaust system 24 or by other gas removing means. It is to be understood that other pollutants in flue gases, such as $NO_x$, as well as other types of gaseous materials and suspended materials, and other reactants capable of cleaning such other different gases or other materials, are contemplated for use in the present invention.

It should also be understood that the placement or location of the exciting means with respect to the process chamber 12 is not considering limiting of the present invention. For example, a pulse combustor or other acoustic exciting means may be mounted or positioned externally to the processing chamber, yet still excite the various acoustic oscillations in the processing chamber. For example, and referring to FIG. 12 by way of example and not by way of limitation to this particular embodiment, an acoustic exciter 19 such as a pulse combustor may be attached to the air inlet 18 as shown at 19a, to the exhaust port 25 as shown at 19b, or to the removal system 22 as shown at 19c. In such alternative configurations, the acoustic excitations produced by the exciter 19, even if spatially removed from the processing chamber 12, will still produce acoustic resonances in the processing chamber provided that the frequency of excitation is properly selected and sufficient acoustic energy can propagate into the processing chamber to sustain resonance.

It will be appreciated that the processing chamber 12 in the system 10 need not be stationary. The pulse combustor or other acoustic exciter may be attached to a rotating or other nonstationary processing chamber such as a rotating kiln while still remaining within the scope of the present invention. For example, the configuration shown in FIG. 11, with the pulse combustor 14h mounted along a longitudinal axis of the processing chamber 12, is particularly suitable for constructing a system including a rotating processing chamber. It will of course be understood that the configuration of FIG. 11 is shown and described below as being suitable for exciting longitudinal acoustic modes, but, as will be understood after the discussion on acoustics which follow, the configuration is not limited to longitudinal modes only.

ACOUSTIC MODES

In as much as the preferred embodiments of the present invention utilize natural acoustic modes in the processing chamber to enhance the various processes occurring therein, it is appropriate to next describe the methods by which such natural acoustic modes may be excited. It will be noted that the processing chambers 12 in the preferred embodiments are generally cylindrical; however, it should be understood that other processing chamber geometrical configurations are also operable. Taking the case of the generally cylindrical processing chamber, those skilled in the art will recognize that in solving wave equations for guides of a circular cross-section, Bessel and classical harmonic oscillator differential equations result. Accordingly, the solution for the pressure P' of a standing three-dimensional acoustic mode within the cylinder may be stated as:

$$P' = [A \cos l\pi y/L][\cos m\theta J_m(S_{m,n}r/R)] \quad \text{(EQUATION 1)}$$

where $l = 0, 1, 2, \ldots$ (purely transverse modes occur for $l=0$);
A = the amplitude of the acoustic pressure oscillations;
y = the axial coordinate of the cylinder;
L = the length of a given cylinder;
$\theta$ = the transverse angular coordinate of the cylinder;
R = the radius of the given cylinder;
r = the radial coordinate of the cylinder;
where $m = 0, 1, 2, \ldots$ (purely radial transverse modes occur for $m=0$ and $l=0$);
where $n = 0, 1, 2, \ldots$ (purely tangential transverse modes occur for $n=0$ and $l=0$); and
$S_{m,n}$ = the eigenvalues representing the solutions of the Bessel function $J'_m(x)=0$.

FIGS. 1 and 2 illustrate the above coordinates and parameters. Those skilled in the art will also recognize that the acoustic resonance inside a generally cylindrical processing chamber depends upon the geometry of the cylinder, and the properties and the temperature of the medium inside the cylinder. The transverse mode frequency must satisfy the following equation:

$$S_{m,n} = \frac{\omega R}{C} = \frac{\omega R}{\sqrt{\gamma RT}} = \frac{2\pi R}{\lambda} \quad \text{(EQUATION 2)}$$

where
$\lambda$ = wavelength;
$\omega$ = frequency;
R = radius of the cylinder;
T = temperature of the medium;

$$C = \sqrt{\gamma RT}$$

= velocity of sound in the cylinder; and
$\gamma = Cp/Cv$ = ratio of specific heats at constant pressure and constant volume.

The natural frequencies of the three-dimensional modes are given by a formula which involves the constant $S_{m,n}$ given in Equation 2, the parameter l described in Equation 1, the length L of the processing chamber, and the acoustic boundary conditions at both ends of the processing chamber.

The natural frequencies of the longitudinal modes are given by a formula which depends upon the length L of the processing chamber and the acoustic boundary conditions of both ends of the processing chamber. For example, when both ends of the processing chamber are closed, the natural frequencies of the longitudinal modes are given by the following formula:

$$f = \frac{\omega}{2\pi} = l\left(\frac{C}{2L}\right) \quad \text{(EQUATION 3)}$$

where
$l = 1, 2, \ldots$
and those of the three-dimensional mode by:

$$f = \frac{\omega}{2\pi} = \frac{C}{2\pi} \sqrt{(S_{m,n})^2 + \left(\frac{l\pi}{L}\right)^2} \quad \text{(EQUATION 4)}$$

where
$l = 0, 1, 2 \ldots$
$m = 0, 1, 2 \ldots$
$n = 0, 1, 2 \ldots$

One consequence of Equations 2, 3 and 4, and the above discussion is that the natural frequencies of the processing chamber depend upon the radius R and length L of the processing chamber, the average temperature therein and the constants $S_{m,n}$ and l which describe the excited mode. Similarly, the frequency of a pulse combustor depends upon the average temperature therein and a characteristic length, $L_c$, such as, for example, in systems incorporating the flame holder type pulse combustors described hereinbelow, the distance $L_c$ between the flame holder and the upstream end of the combustor. Thus, depending upon the characteristics of the excited processing chamber mode, the characteristic combustor length $L_c$ can be larger or smaller than the radius R of the processing chamber. It is expected, however that generally $L_c \geq R$ when low frequency modes are excited and that $L_c < R$ when higher frequency modes are excited.

It will therefore be understood by those skilled in the art that varying $L_c$ has the effect of varying the frequency of the pulse combustor and therefore the frequency of excitation inside the processing chamber.

Another important observation is that while orientation of acoustic exciting means influences the characteristics of the excited oscillations, frequency of excitation is the predominant factor. For example, it should be apparent that tangentially directed pulses of heated gases from pulse combustors are more likely to excite tangential modes than radial modes. However, because the internal acoustic characteristics of the processing chamber, and not external influences, are determinative of the frequencies of the natural acoustic modes, provision of sufficient pulsating energy at the natural resonance frequencies of desired modes of operation will generally excite the modes regardless of orientation of the exciting means.

As a practical matter, the acoustic modes of resonance will be detected in the following manner. A microphone or other acoustic pick-up transducer or detector should be attached to the exterior of the processing chamber, or on the interior if the temperature inside the chamber will not adversely affect the transducer. The chamber should then be excited with suitable exciting means, as described herein. The amplitude of acoustic excitation as detected by the transducer should then be displayed as a function of frequency. As the frequency is varied over a range, maxima and minima of the amplitude will be observed; the maxima will indicate the frequencies of the natural modes of acoustic resonance. Longitudinal, transverse and three-dimensional resonances may be confirmed through a comparison with the expected resonance frequencies, found through a theoretical analysis according to Equations 1-4.

It will of course be understood that operation at a particular resonance mode will not necessarily be the end of the inquiry when preparing a particular process for use in accordance with the present invention. Those skilled in the art will understand that optimization of some parameter of the process is the ultimate consideration. For example, in the particular case of kaolin or food product drying, the moisture content of the end product is the parameter of interest. Other processes will have other parameters of interest, for example, a chemical process may have the concentration of a particular constituent compared to other constituents as the primary parameter of interest. Likewise, the temperature of the end product being subjected to a process may be another parameter of interest. Accordingly, to optimize a given process to take maximum advantage of the acoustic excitations being induced in the processing chamber, it will be necessary to monitor the parameter of interest as a function of the frequency and amplitude of the oscillations.

As a particular example, it may be observed that the moisture content of a product such as kaolin or food product reaches a desired level when the processing chamber is operated at a frequency of excitation which does not exactly match one of the natural resonance modes. In accordance with the invention, then, the process should be operated at the optimization frequency for desired moisture content and not at a particular resonance mode. The presence of pulsations in the processing chamber will still affect and enhance the process, notwithstanding that the desired end result or parameter is optimized at a frequency different from one of the natural acoustic resonance modes of the processing chamber.

Figure 2A:
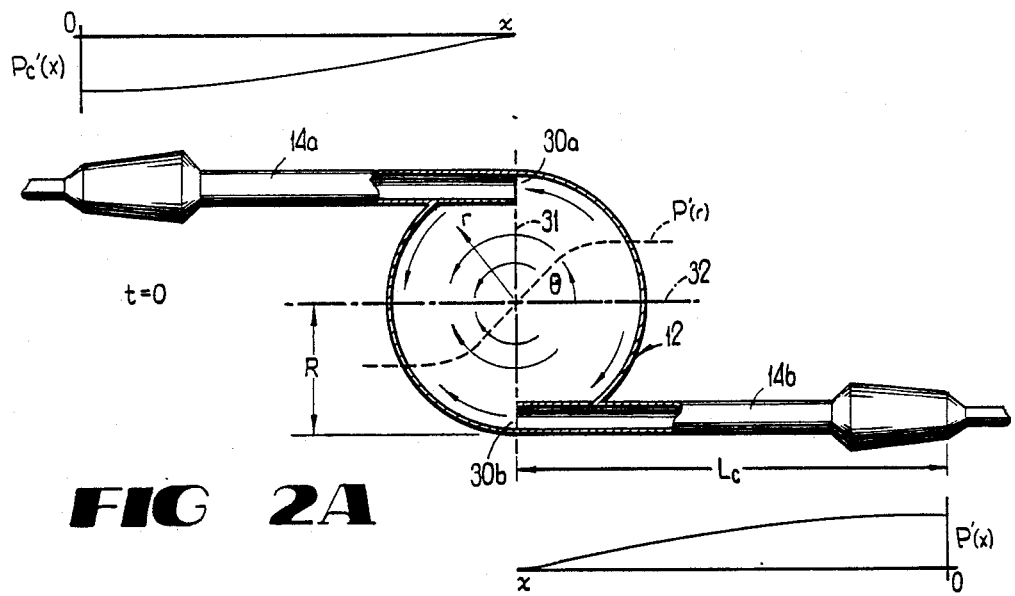
FIG. 2, consisting of FIG. 2A and FIG. 2B, comprises schematic end views, in cross section, of the preferred embodiment of FIG. 1, showing pressure and flow stream lines in the processing chamber when its first tangential mode is excited.
Figure 2B:
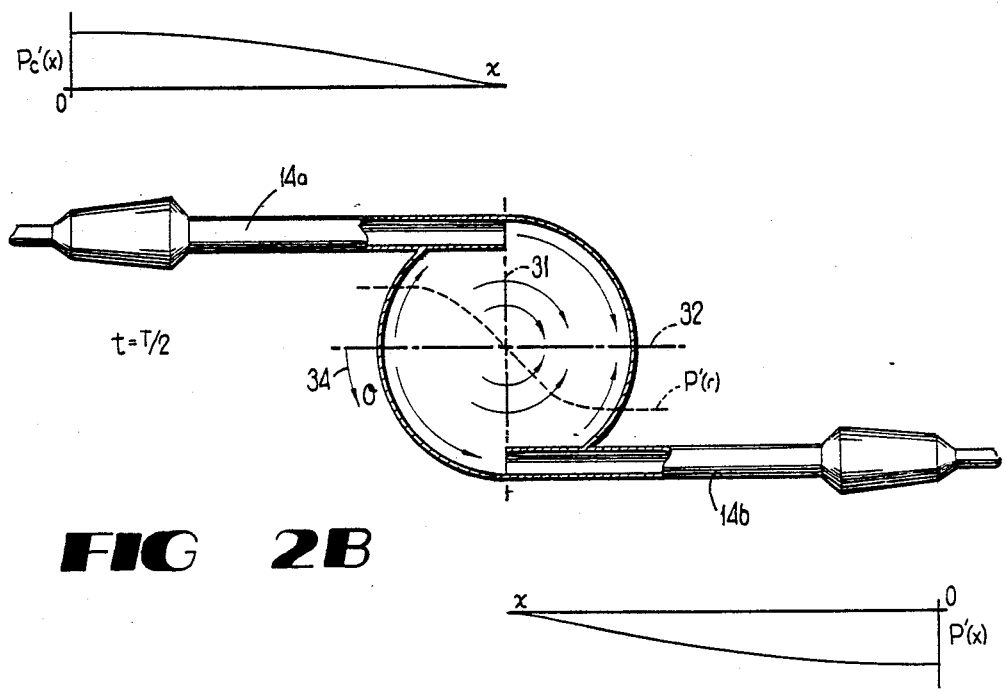

FIG. 2 provides instantaneous views of the pressure and flow stream lines at the beginning of a period of oscillation (time $t=0$) in FIG. 2A and at the middle of the period ($t=T/2$) in FIG. 2B, for the first tangential mode ($n=0$ in Equation 1). The pulse combustors $14a$, $14b$ in FIG. 2 operate at the same frequency but in a phased relationship, and have acoustic pressure distributions $P'(x)$ upstream of the flame holder similar to the acoustic pressure $P'(r)$ occurring inside the processing chamber 12. The exhaust outlets $30a$, $30b$ of the pulse combustors align with a pressure nodal line 31, and the pulse combustors are mounted to exhaust heated gases along paths which at least initially are tangential to the processing chamber wall 12.

As illustrated by the $P'(r)$ curves in FIG. 2, which represent the instantaneous pressure inside the processing chamber, the instantaneous pressure on the right side shifts from positive in FIG. 2A at time $t=0$, to negative in FIG. 2B at time $t=T/2$, every half cycle. It will therefore be appreciated that a "sloshing" circumferential or circular motion is imparted to the molecules of hot gases in the processing chamber 12, as the processing chamber is alternately supplied by pulses of hot gases by each combustor $14a$, $14b$. It will, of course, be understood that synchronized out-of-phase operation is required to excite this tangential mode in the configuration of FIG. 2, in that in-phase operation would result in the creation of a continuous clockwise travelling acoustic mode in the processing chamber.

It should be generally understood that the pulse combustors shown in the systems of FIGS. 1-11 may be of the type shown in FIGS. 15-20. In the particular case of FIG. 2, the pulse combustors are tuned to a predetermined frequency to excite the first tangential mode, where $S_{1,0}=1.84129$. The frequency of operation of the tunable pulse combustors shown in FIGS. 15-20 depends upon the length $L_c$ between the flame holder 200 and the upstream end of the combustor tube 202. Accordingly, the length $L_c$ should preferably be selected to be of the order of the radius of the dryer in order to successfully excite the first tangential mode oscillations. In preferred embodiments, however, the pulse combustors or other acoustic exciter should preferably be frequency tunable.

The tangential mode in FIG. 2 is considered a "standing" transverse acoustic mode, because the nodal line 32 is stationary and does not move. It should, however, be understood that spinning transverse modes, where the nodal line 32 possesses an angular velocity, may also be excited. For example, and as shown in FIG. 2B, imparting an angular velocity to the nodal line results in motion in the direction of arrow 34. Those skilled in the art will appreciate that angular movement of the nodal lines may be induced by synchronized operation of the pulse combustors $14a$, $14b$ at the same frequency with a predetermined phase difference which is not equal to 180 degrees. Also, under certain conditions, a combination of a "standing" and spinning transverse acoustic modes may be excited in the processing chamber by various arrangements of the pulse combustors $14a$, $14b$.

Figure 5:
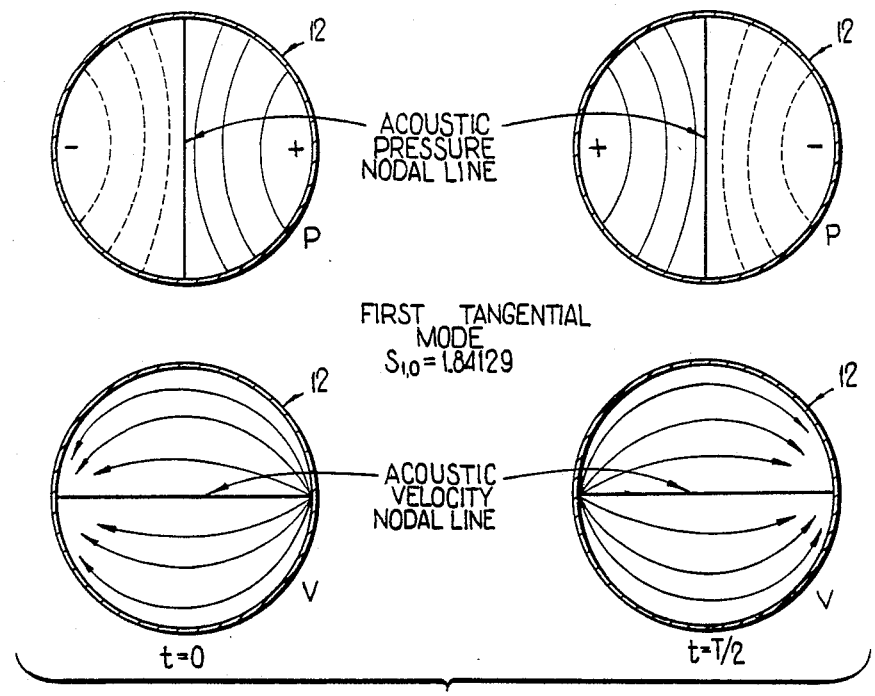
FIG. 5 illustrates the instantaneous pressure and flow stream lines oscillations of the first tangential mode of a cylinder at the beginning and midway of a period of oscillation.

FIG. 5 illustrates the instantaneous pressure and flow stream lines oscillations for the first tangential mode of the processing chamber 12 at the beginning of the period at time $t=0$, and midway through the period at time $t=T/2$. It may be observed from this figure that the "sloshing" type stream line oscillations characterize the first tangential mode, while the acoustic pressure gradation lines intersect the velocity nodal lines orthogonally.

It should be understood that in this example the "sloshing" type behavior of the first tangential mode velocity field will exist in every transverse plane of the processing chamber, inasmuch as longitudinal and radial modes are not deliberately excited, and $l=0$ and $n=0$ in Equation 1. In accordance with the present invention, the interaction of the acoustic resonance of the first tangential mode of the cylinder with material to be processed in the processing chamber enhances the process.

Figures 6A, 6B:
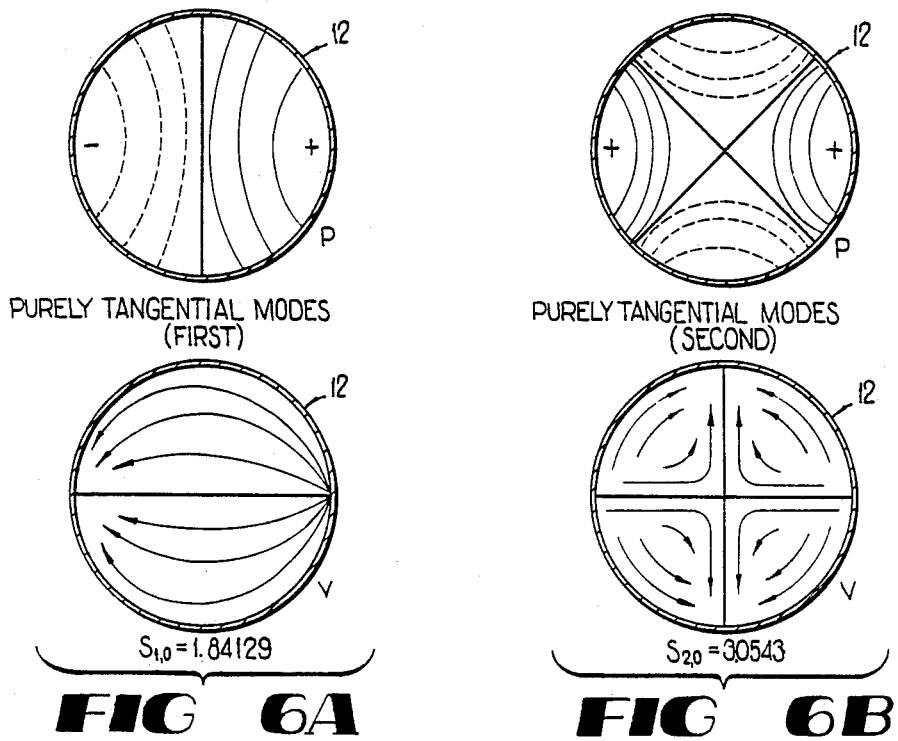
FIG. 6, consisting of FIGS. 6A and 6B, illustrates first and second tangential modes of oscillation.

It should also be understood that natural acoustic modes other than the first tangential mode may be excited by the system herein disclosed. For example, while FIG. 6A illustrates the first purely tangential mode as in FIG. 5, FIG. 6B illustrates the second tangential mode, where $S_{2,0}=3.0543$ in Equation 1, having pressure and flow stream lines diagrams as illustrated therein. It will also be understood and appreciated that other higher tangential modes may also be excited, although as a practical matter the first and second will usually be the easiest to excite and maintain.

Figure 7A:
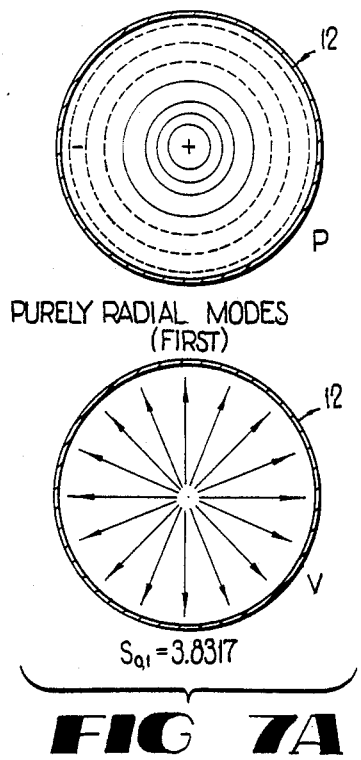
FIG. 7, consisting of FIGS. 7A and 7B, illustrates first and second radial modes of oscillation.
Figure 7B:
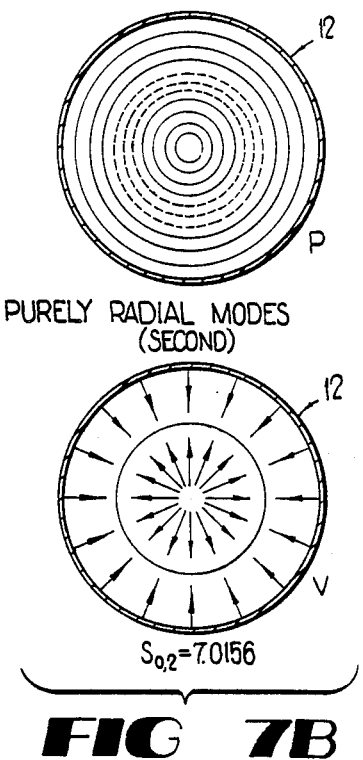

In a similar manner, FIG. 7 illustrates purely radial modes of oscillation, where $l=0$ and $m=0$ in Equation 1. In FIG. 7A, the pressure P and flow stream lines V characteristic of the first radial mode are illustrated, for $S_{0,1}=3.8317$. FIG. 7B illustrates the second radial mode, for $S_{0,2}=7.0156$. Again, other higher order radial modes are also contemplated in the present invention, but the first and second modes are believed to be of the most practical utility.

Figure 8A:
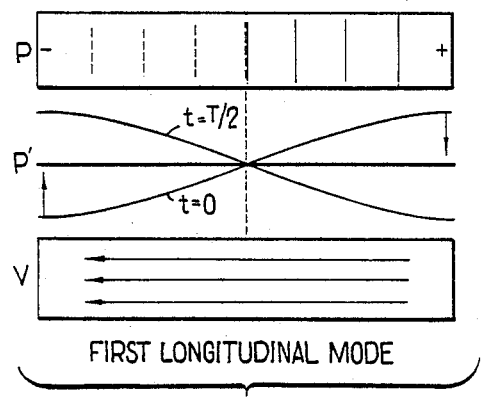
FIG. 8, consisting of FIGS. 8A and 8B, illustrates first and second longitudinal modes of oscillation.
Figure 8B:
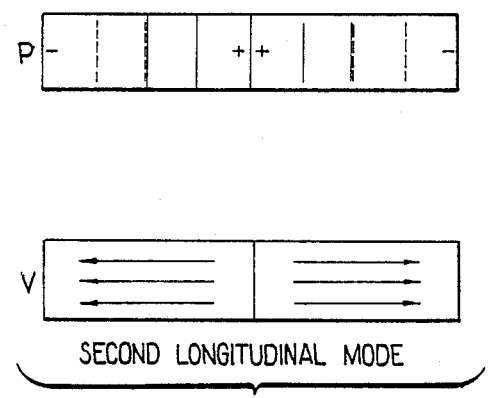

It should also be understood that other transverse acoustic modes with motions consisting of combinations of radial and tangential oscillations are also contemplated in the present invention. For example, the transverse mode characterized by l=0, m=1, and n=1 in Equation 1 is such a combined tangential-radial mode. In a similar manner, FIG. 8 illustrates purely longitudinal modes of oscillation, where m=0 and n=0 in Equation 1. In FIG. 8A, the pressure P and flow stream lines V characteristic of the first longitudinal acoustic mode, where l=1 in Equation 1, are illustrated. The frequency of this mode equals C/2L Hertz (Hz.). FIG. 8B illustrates the pressure P and flow stream lines V of the second longitudinal mode, where l=2 in Equation 1, having a frequency of C/L Hz. Again, higher order longitudinal modes are also contemplated in the present invention, but the lowest longitudinal modes are believed to be of the most practical utility.

A combination of a particular transverse mode and a particular longitudinal mode may be considered a three-dimensional mode, due to the fact that three-dimensional acoustic modes may be decomposed into their transverse components and longitudinal components. This fact is apparent in Equation 4 which shows that the frequency of a three-dimensional mode is proportional to the frequencies of the transverse and longitudinal modes. Accordingly, it will be understood that deliberate excitation of particular three-dimensional acoustic resonances in the processing chamber is within the scope of the present invention.

It should also be understood that excitation of longitudinal modes simultaneously with transverse modes may inevitably occur when the frequencies of one or more longitudinal and/or transverse modes are smaller than the frequency of the excited transverse or three-dimensional mode. For example, assume that for a given processing chamber, it is desired to excite the first tangential mode, and that the frequency required to excite this mode is 600 Hertz (Hz). Assume further that the natural frequencies of the first four longitudinal modes are below 580 Hz. Due to the differences between these frequencies, excitation of the first tangential mode could simultaneously excite one or more of the four longitudinal modes in this example. It will therefore be understood that operation with simultaneous excitation of several acoustic modes are contemplated in the present invention. Specifically, all natural acoustic modes of the processing chamber having frequencies smaller than the frequency of the excited mode could be excited and be present in the processing chamber together with the excited mode. For example, the first longitudinal mode could be excited when any transverse or three-dimensional mode is excited.

METHODS FOR EXCITING NATURAL ACOUSTIC MODES

FIGS. 9–11 illustrate orientation of combustors or other excitation means to excite various acoustic modes in the processing chamber 12. Of course, it will be recalled that the configuration shown in FIG. 2 may be employed to excite tangential and other modes. In addition, and as shown in FIG. 9, a tandem pair of parallel, aligned combustors 14c, 14d can be tangentially connected to opposite tangents of the processing chamber 12 and operated in phase in order to excite tangential oscillations. Analogous to the case of FIG. 2, out-of-phase operation of the parallel tandem combustors 14c, 14d would result in a spinning motion of the first tangential mode in the processing chamber. It is to be understood that tandem or other placements of one or more pulse combustors may be used to excite the first tangential mode of the processing chamber.

FIG. 10 illustrates placement of combustors 14e, 14f, and 14g to excite one of the radial modes of the processing chamber 12. As shown in FIG. 10, combustors 14e, 14f, and 14g are mounted aligned with the radii of the generally cylindrical processing chamber 12 so that the exhaust outlets 30e, 30f, and 30g are tangential to the circular acoustic pressure nodal line 35 of the excited radial mode. Additional pulse combustors installed in a manner similar to that of combustors 14e, 14f, and 14g may be added if additional energy input and/or larger pulsation amplitudes are required in the processing chamber 12. Finally, other pure radial modes of the processing chamber 12 may be excited by using pulse combustors having the same frequency as that of the mode to be excited and positioning their exhaust exit planes tangential to one or more circular acoustic pressure nodal lines of the mode to be excited.

Referring next to FIG. 11, mounting of a combustor 14h so that the exhaust outlet 30h is positioned at a distance L/2, where the total length of the processing chamber 12 is L, tends to excite the fundamental longitudinal mode of oscillation.

It should also be understood that the excitation of three-dimensional acoustic modes of the processing chamber by use of similar excitation methods is contemplated in the present invention. In the contemplated configurations, the exit planes of one or more pulse combustors will be aligned tangentially with one or more velocity anti-nodal surfaces of the mode to be excited, and the pulse combustors will be operated with the frequency of the mode to be excited.

As has been described above, the preferred embodiments employ tunable pulse combustors for exciting desired acoustic modes. However, it should be understood that various means for producing acoustic excitations in the processing chamber 12 may be successfully employed to excite the acoustic modes. Tunable pulse combustors suitable for use as excitation means are illustrated in FIGS. 15–20 and described herein below. Other suitable excitation means will be described next.

FIG. 12 illustrates another technique for exciting acoustic modes in the processing chamber 12. In the embodiment 10" shown in FIG. 12, material to be dried is provided through the supply line 16 as in the embodiment of FIG. 1. However, a different combustor design 202 is utilized to supply the hot gas flow and excite the acoustic mode oscillations in the processing chamber 12. The combustor 202 of the illustrated embodiment is attached to the processing chamber 12 at a location above the wet material injection nozzles 17. The combustor 202 includes one or more air inlet ports 204, fuel injection orifices 203, a centerbody 205 for supporting the disc flame holder 200, and for supplying additional fuel through orifices 206, and an igniter 207. The centerbody is translatable along directions shown by arrows 225.

Upon ignition, combustion occurs in vortices 209 which form inside the shear layers 210 and 211 located downstream of the disc flame holder 200 and the combustor-processing chamber interface 212. The combustion processes inside these vortices are unsteady and excite one or more of the natural acoustic modes of the processing chamber 12. The type of excited mode and its amplitude may be controlled by axial translation of the centerbody 205 and/or changing the diameter of the flame holder 200 or combustor 202. It is to be understood that in the present embodiment the combustion process within the shear layers can occur within the combustor 202, the processing chamber 12, or both. Also, the invention is not restricted to the use of disc shaped flame holders; flame holders having conical, rod-like, gutter-like, and other configurations are contemplated within the scope of this invention because such flame holders can also excite desired acoustic oscillations within the processing chamber 12 as long as they are capable of producing the shear layers and the reacting vortices having the desired properties.

Figure 13:
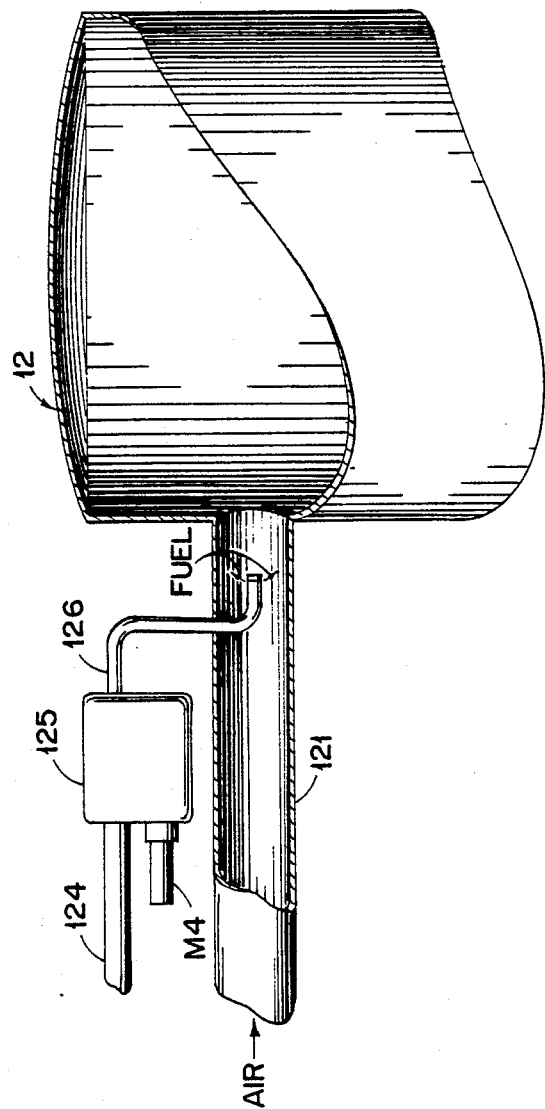
FIG. 13 is a partial schematic side view, in cross section, of yet another embodiment of a material processing system constructed in accordance with the present invention, wherein a constant flow rate air stream and a modulated flow rate fuel stream are supplied directly to the processing chamber and employed to excite a periodic combustion process and acoustic mode oscillations of desired frequency inside the processing system.

Turning now to FIG. 13, another method for exciting natural acoustic mode oscillations inside the processing chamber 12 is illustrated, with a fuel modulator 125. Air is supplied through pipe 121 which connects to the processing chamber 12. Fuel is supplied through a fuel line 124 into a fuel flow modulator 125, which modulates the flow of fuel through pipe 126 into the pipe 121 to provide a combustible mixture inside pipe 121 whose composition changes periodically in time with the frequency of fuel modulation. The combustible mixture is delivered to the processing chamber where it is burned in the vicinity of the interface between pipe 121 and the processing chamber 12. Because the composition of the combustible mixture varies periodically with time, the reaction rate is also periodic. This results in the excitation of acoustic pulsations inside the processing chamber 12. By matching the frequencies of the fuel flow modulation and the reaction rate with the frequency of one of the natural acoustic modes of the processing chamber, the periodic combustion process will excite this mode and, possibly, excite other modes within the processing chamber.

Figure 14:
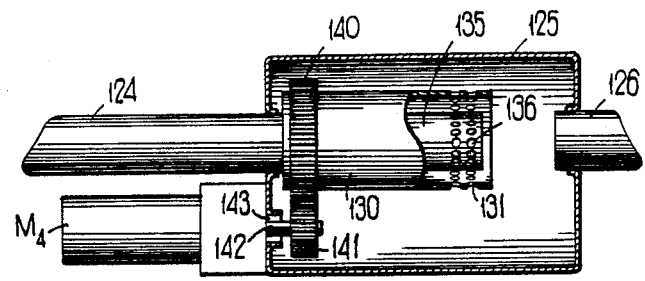
FIG. 14 is a detailed side view, partly broken away, of the rotating-sleeve fuel flow modulator employed in the embodiment of FIG. 13.

FIG. 14 illustrates a preferred embodiment of the fuel flow modulator 125 employed in the system of FIG. 13. The fuel flow modulator 125 comprises a fixed fuel inlet pipe or sleeve 135 connected to receive a flow of fuel from fuel line 124, and a concentric rotating sleeve 130 positioned on the exterior of the inlet pipe 135. The fixed sleeve 135 includes a plurality of orifices 131 positioned diametrically around a circumference of the pipe. The rotating sleeve 130 also includes a similar plurality of orifices 136 which are radially alignable opposing the orifices 131 in the fixed sleeve.

The rotating sleeve 130 is affixed to an idler gear 140, which is driven by a drive gear 141. A shaft 142 connected to a motor $M_4$ is provided through a bushing 143 in the side wall of the fuel flow modulator 125. It will be appreciated that the speed of rotation of motor $M_4$ controls the speed of rotation of the rotating sleeve 130, thereby controlling the frequency of modulation of fuel flow. It will also be appreciated that the rotation of the rotating sleeve 130 periodically interrupts the flow of fuel introduced through the fuel inlet pipe 124, so that the fuel flow exciting the modulator 125 via the fuel pipe 126 is modulated as a function of the speed of rotation of the rotating sleeve 130.

IMPROVED PULSE COMBUSTORS

Turning next to FIGS. 15-20, the pulse combustors 14a-f of FIGS. 15-20 are particular preferred embodiments of pulse combustors constructed in accordance with the present invention. These pulse combustors are not necessarily the same as the pulse combustors 14a-g of FIGS. 1-3 and 9-10. However, it should be understood that the systems shown in these latter figures may be constructed with the pulse combustors of FIGS. 15-20.

Figure 15:
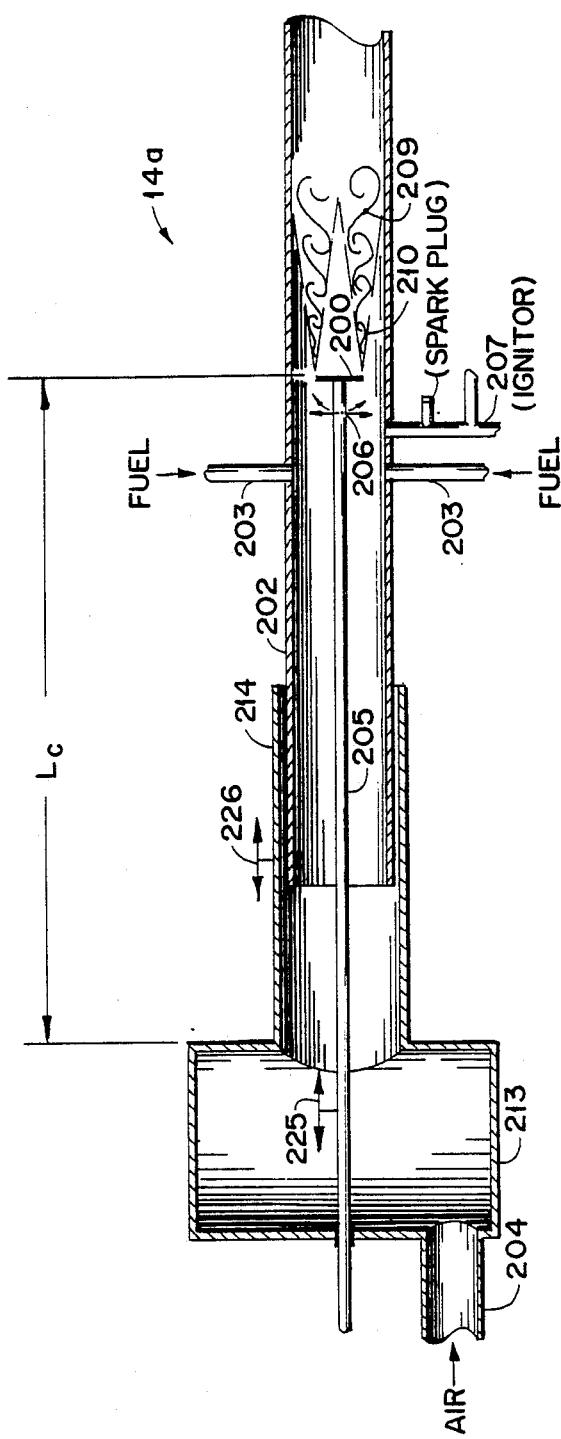
FIG. 15 is a schematic view, in cross section, of a preferred embodiment of a tunable, variable length, straight pipe, pulse combustor with a translatable, open upstream end attached to a decoupler and a disc shaped flame holder attached to a centerbody which can be translated along the combustor.

FIG. 15 illustrates a preferred embodiment of a tunable pulse combustor 14a which can be used to excite longitudinal, transverse and three-dimensional acoustic modes in the processing chamber of the present invention. The pulse combustor 14a comprises a combustor tube 202 (which generally consists of a straight pipe), and a centerbody 205 which supports a disc shaped flame holder 200. The centerbody 205 is a rod or tube containing a plurality of fuel injection orifices 206 which supply part or all of the required fuel. Air for combustion is supplied through inlet pipe 204 into an upstream acoustic decoupler 213 which communicates with the upstream end of the combustor tube 202. The decoupler 213 minimizes the propagation of pulsations into the air supply pipe 204. All or part of the needed fuel can be supplied through orifices 203 located in the outer combustor wall in the vicinity of the flame holder 200. To start the combustor 14a, a combustible mixture is ignited by the ignitor 207. Subsequently, unsteady combustion occurs inside the vortices 209 which form inside the shear layer 210 downstream of the flame holder 200. These unsteady combustion processes excite natural acoustic oscillations in the combustor tube 202 upstream of the flame holder 200. The frequency of these oscillations is determined by the length $L_c$ between the flame holder 200 and the upstream decoupler 213. In the embodiment illustrated in FIG. 15 the length $L_c$ will be approximately equal to half the wavelength of the excited pulsations whose frequency f is determined by the following equation:

$$f=L_c/(2C) \tag{EQUATION 5}$$

where C is the speed of sound.

As discussed above, the frequency of pulsations can be changed by changing the length $L_c$. The embodiment shown in FIG. 15 changes the length of the combustor tube 202 with a sleeve-type arrangement 214 and/or axial translation of the centerbody 205 which moves the location of flame holder 200. The upstream decoupler 213 with the sleeve 214 can move longitudinally along arrows 226 to change the length $L_c$ between the decoupler 213 and the flame holder 200. Similarly, longitudinal translation of the centerbody 205 along arrows 225 changes the length $L_c$.

It is to be understood that in the embodiment shown in FIG. 15, acoustic pulsations will not be restricted to the region upstream of the flame holder. Pulsations will also be excited in the combustor tube section downstream of the flame holder 200, and/or in a system attached to the downstream end of the combustor such as, for example, the processing chamber 12.

Additional means for controlling the range of acoustic frequencies which could be excited by combustor 14a include changing the diameter of the combustor tube 202, the diameter of the flame holder 200, and the ratio of the flame holder diameter and combustor tube diameter. It is also to be understood that decreasing the combustor tube diameter will generally increase the magnitudes of the excited frequencies.

Figure 16:
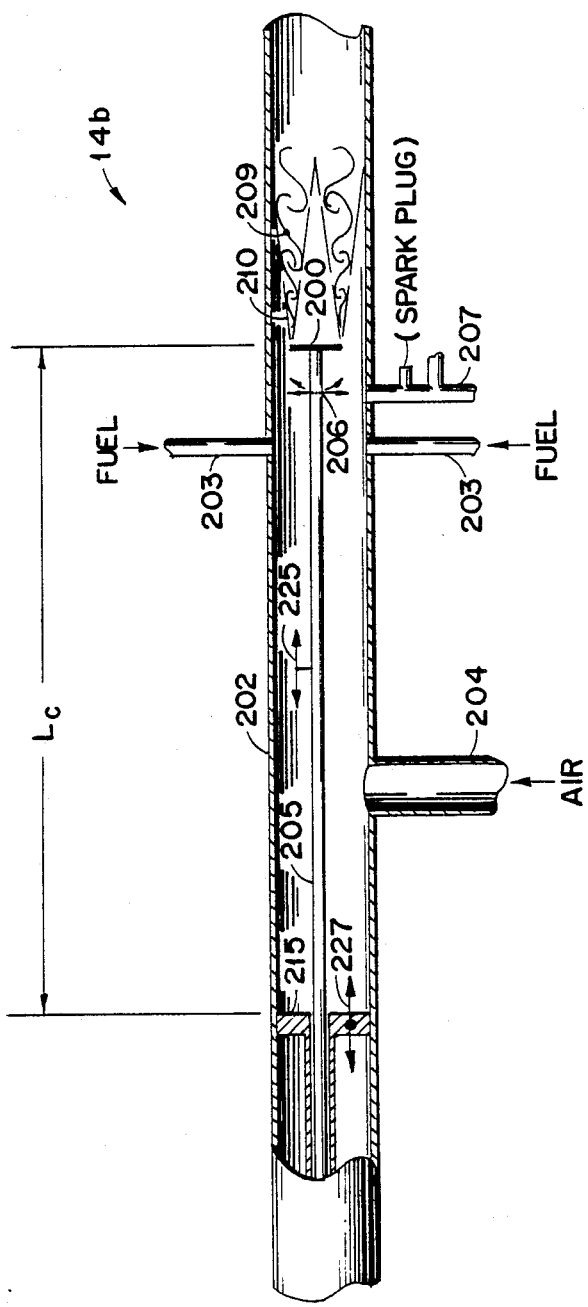
FIG. 16 is a schematic view, in cross section, of another preferred embodiment of a tunable, variable length, straight pipe, pulse combustor with a translatable, closed upstream end and a disc shaped flame holder attached to a centerbody which can be translated along the combustor.

Another preferred embodiment of a tunable pulse combustor 14b is shown in FIG. 16. In this embodiment combustion air is supplied through an air inlet pipe 204 located just downstream of the closed upstream end 215 of the combustor tube which requires that the acoustic velocity there be zero. Consequently, in the embodiment of FIG. 16 the length $L_c$ between the flame holder 200 and the upstream termination 215 will equal one quarter of the wavelength of the excited acoustic oscillation and the resulting frequency f will equal:

$$f = L_c/(4C) \qquad \text{(EQUATION 6)}.$$

Examination of the above equation shows that the frequency of pulsations can be controlled by changing the length $L_c$ shown in FIG. 16. This can be accomplished by moving the termination 215 along arrows 227, the centerbody 205 and flame holder 200 along arrows 225, or both. The centerbody 205 is a rod or tube extending along the longitudinal axis through an aperture in the upstream end of the combustor tube. Again, as in the embodiment of FIG. 15, the pulsations in the embodiment of FIG. 16 are excited by unsteady combustion processes inside vortices 209 which form inside the shear layer 210 downstream of the flame holder 200.

Figure 17:
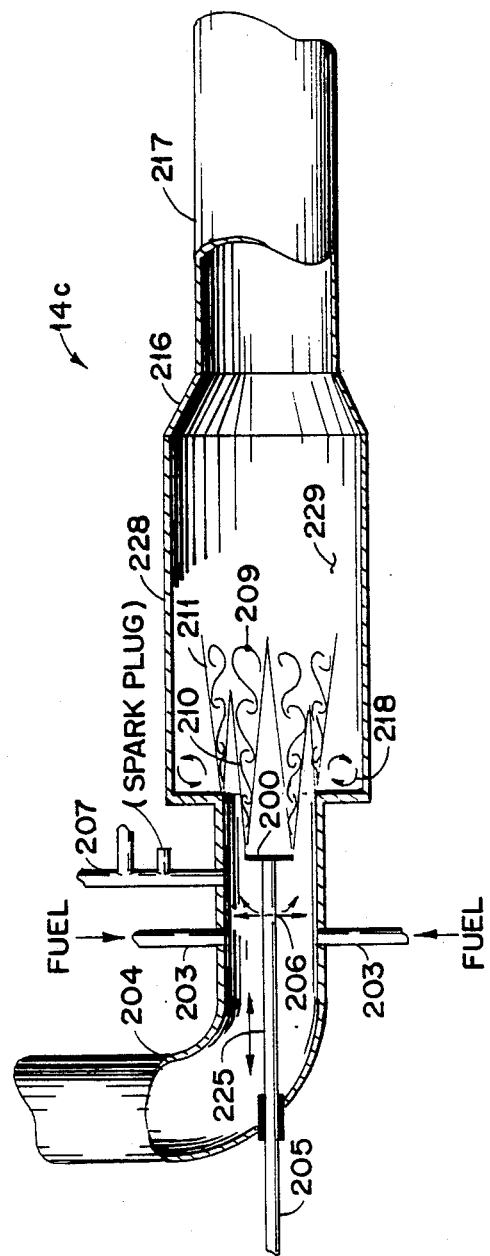
FIG. 17 is a schematic view, in cross section, of another preferred embodiment of a tunable pulse combustor which utilizes the corner at the interface between the air inlet and the combustor and a disc shaped flame holder attached to a translatable centerbody to generate two shear layers which interact with one another.

FIG. 17 illustrates another preferred embodiment of a tunable pulse combustor 14c which excites acoustic mode oscillations in a processing chamber. The pulse combustor 14c includes a combustion chamber 229 which is comprised of a straight cylindrical pipe 228 connected to a convergent pipe section 216 which connects to a tail pipe 217 at its downstream end. The tail pipe 217 is used to exhaust the combustion products from the combustor 14c and to serve as a wave guide through which the pulsations propagate to other systems which may be attached to the pulse combustor 14c such as, for example, the processing chamber 12. Air for combustion is provided through the air inlet 204 which may be L-shaped, although it could be bent into any other convenient shape. The diameter of the air inlet pipe 204 is smaller than the diameter of the initial combustor section 228. As a result, a recirculation region, where combustion occurs, is formed in the corner region 218. This recirculation region 218 serves as an ignition source for fresh charges of fuel and air which continuously enter the combustor.

Fuel for combustion is supplied through at least one injection orifice 203 which may be located either in the air inlet wall just upstream of the combustor, and/or at the interface of the air inlet with the combustor. Fuel can also be supplied through orifices 206 in the centerbody 205. A disc shaped flame holder 200 is attached to the downstream end of the centerbody 205. The flow of the air and fuel past this flame holder 200 results in the formation of a shear layer 210 downstream of the flame holder. An additional shear layer 211 is formed downstream of the interface between the combustor 214 and the air inlet 204. Unsteady combustion occurs inside vortices 209 which form inside these shear layers. These unsteady combustion processes excite acoustic oscillations in the air inlet, the combustor and any system which may be attached to the downstream end of the tail pipe 217.

In the embodiment shown in FIG. 17, the frequency and amplitude of the excited pulsations can be controlled by axial translation of the flame holder 200 along arrows 225 within the combustor, changing the diameter of the disc flame holder, and changing the combination and locations of fuel orifices used to inject a given amount of fuel into the combustor. It should be also pointed out that the use of other flame holder geometries such as a cone, a ring and the like are also contemplated.

Figure 18:
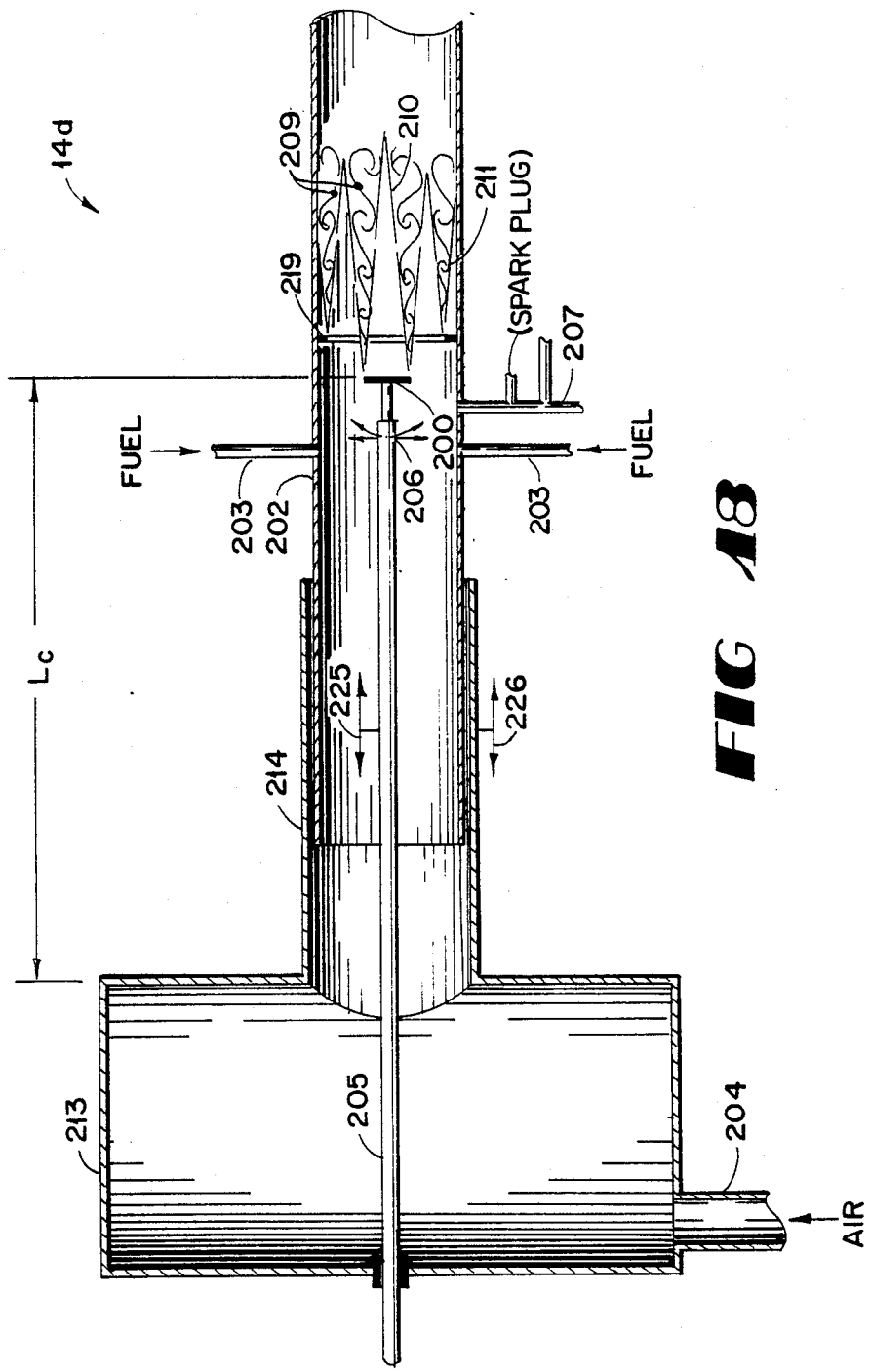
FIG. 18 is a schematic view, in cross section, of another preferred embodiment of a tunable, straight pipe, pulse combustor with a translatable, open upstream end, which utilizes a flat annular ring attached to the pipe's inner wall and a translatable, disc shaped, flame holder to generate two shear layers which interact with one another.

FIG. 18 illustrates another preferred embodiment of a tunable pulse combustor 14d which can be used to excite longitudinal, transverse and three-dimensional acoustic modes in a processing chamber according to the present invention. The pulse combustor 14d includes a combustor tube 202 which comprises a straight pipe and a centerbody 205 attached to a disc shaped flame holder 200 at its downstream end. An additional annular flat ring or large orifice type flame holder 219 is attached to the outer combustor wall in the vicinity of the location of the flame holder 200. The centerbody 205 contains at least one fuel injection orifice 206 which supplies part or all of the required fuel. Another set of orifices 203, located in the outer combustor wall in the vicinity of the flame holders 200 and 219, can be used to supply all or part of the needed fuel. Air for combustion enters the upstream decoupler 213 through inlet pipe 204. The upstream decoupler is connected to the upstream end of the combustor tube 202 by a sleeve-type connection 214 which provides a capability for lengthening or shortening the combustor by moving the sleeve along arrows 226.

Unsteady combustion occurs inside vortices 209 which are transported by the gas flow inside the shear layers 210 and 211 formed downstream of the flame holders 200 and 219. These unsteady combustion processes excite longitudinal acoustic oscillations in the combustor tube 202 upstream of the disc flame holder 200. The frequency of these oscillations is determined by the length $L_c$ between the flame holder 200 and the upstream decoupler 213. In the embodiment shown in FIG. 18, the length $L_c$ approximately equals half the wavelength of the excited acoustic oscillations whose frequency f is determined by Equation 5 above.

Figure 19:
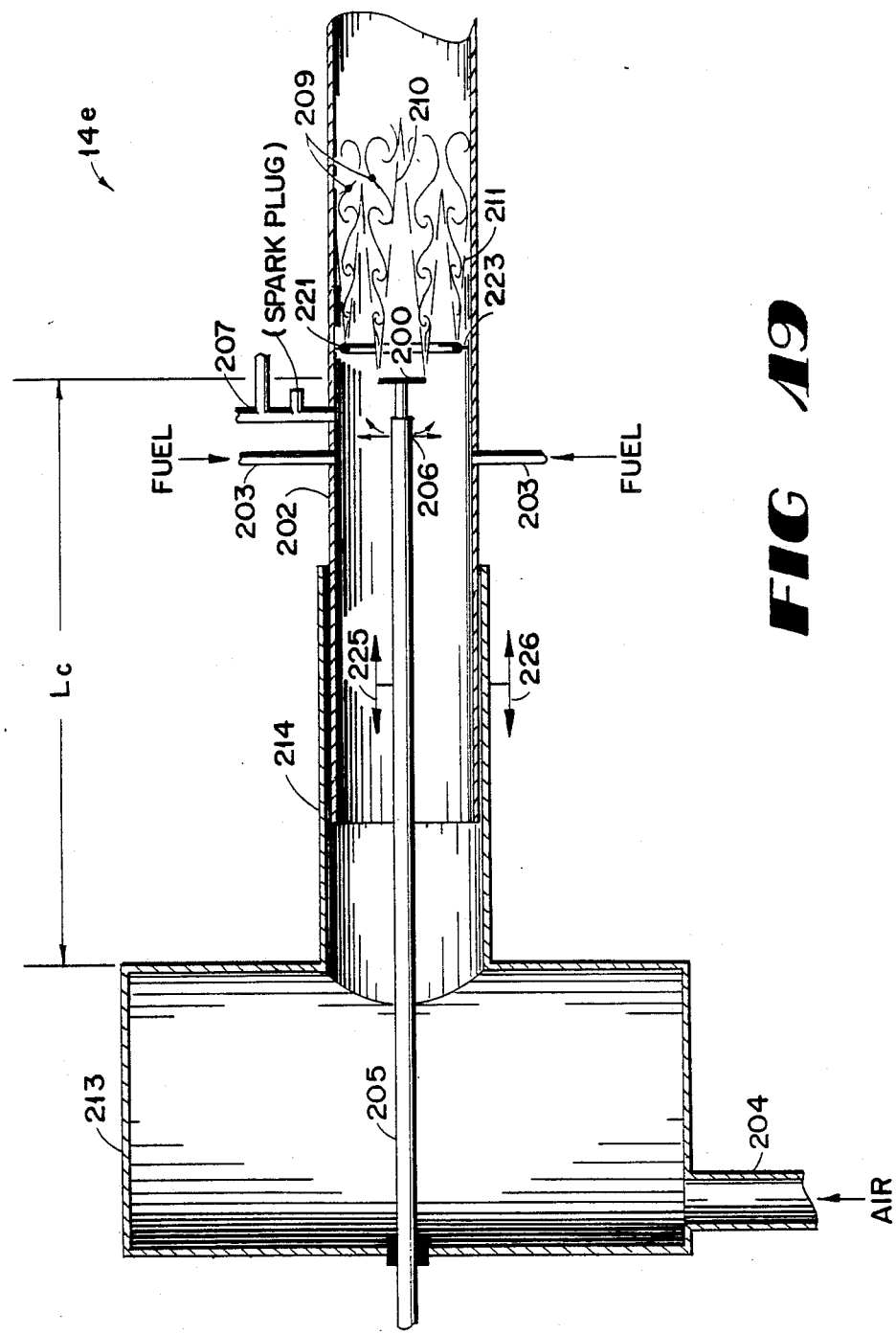
FIG. 19 is a schematic view, in cross section, of another preferred embodiment of a tunable, straight pipe, pulse combustor with a translatable, open upstream end, which utilizes a ring attached to the combustor tube wall and a disc welded to the downstream termination of a translatable centerbody to generate two shear layers which interact with one another.

FIG. 19 illustrates another embodiment of a tunable pulse combustor 14e which can be used to excite longitudinal, transverse and three-dimensional acoustic modes in the processing chamber of the present invention. The combustor tube 202 of the pulse combustor 14e comprises a straight pipe. The combustor tube 202 connects to the upstream decoupler 213 via a sleeve-type arrangement 214, which provides means for changing the length of the combustor 202 by moving the sleeve along arrows 226. The combustor 14e includes a centerbody 205 which is attached to a disc shaped flame holder 200 at its downstream end. An additional, circular, ring shaped, flame holder 221 is attached, via thin rods 223, to the outer combustor wall in the vicinity of the downstream end of the centerbody 205. The thin rods 223 are standards which displace the annular flame holder from the wall of the combustor tube. The flame holder 200 can be moved relative to the annular flame holder 221 by moving the centerbody 205 along arrows 225.

The centerbody 205 in the embodiment of FIG. 19 contains fuel injection orifices 206 which supply part or all of the required fuel. All or part of the needed fuel can be also supplied through an additional set of orifices 203 located in the outer combustor wall in the vicinity of the flame holder 221. Air for combustion is supplied through an inlet pipe 204 into the upstream decoupler 213 which is connected to the upstream end of the combustor tube 202.

Unsteady combustion occurs inside vortices 209 which are transported by the flow inside shear layers 210 and 211 which form downstream of the flame holders 200 and 221. These unsteady combustion processes excite longitudinal acoustic oscillations in the combustor tube upstream of the flame holders 200 and 221. The frequency of these oscillations is determined by the length $L_c$ between the flame holders and the upstream decoupler 213. In the embodiment shown in FIG. 19, the length $L_c$ approximately equals half the wavelength of the excited acoustic oscillations whose frequency f is determined by Equation 5 above.

Figure 20:
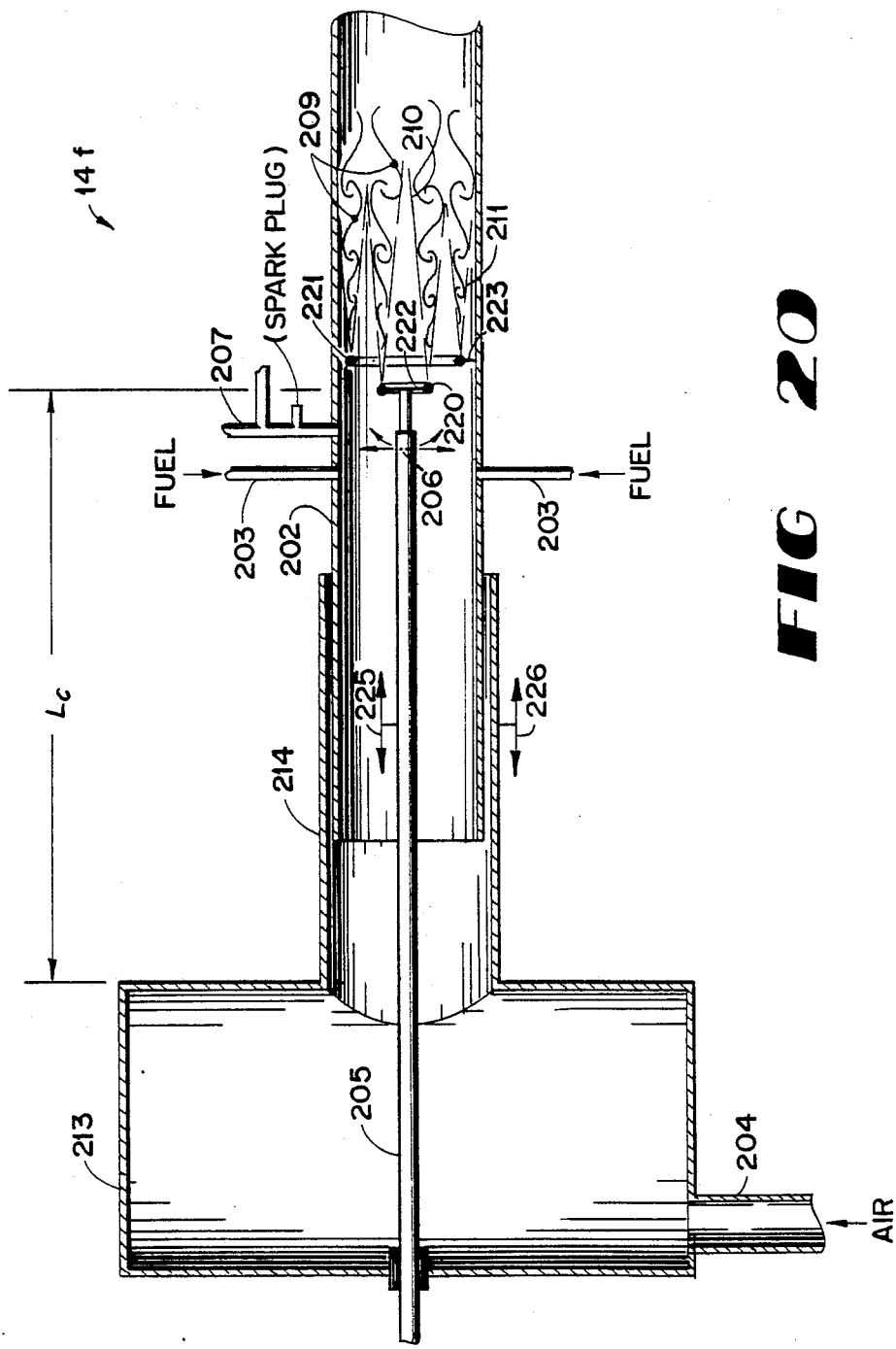
FIG. 20 is a schematic view, in cross section, of another preferred embodiment of a tunable, straight pipe, pulse combustor with a translatable, open upstream end, which utilizes a circular ring flame holder attached by thin metal rods to the outer combustor tube wall and a ring flame holder attached to a translatable centerbody to generate two shear layers which interact with one another.

FIG. 20 illustrates yet another preferred embodiment of a tunable pulse combustor 14f which can be used to excite longitudinal, transverse and three-dimensional acoustic modes in the processing chamber of the present invention. The straight pipe combustor tube 202 connects to the upstream decoupler via a sleevetype arrangement 214, which provides a means for changing the length of the combustor 202 by moving the sleeve 214 along arrows 226. The combustor includes a centerbody 205 which is attached, via thin metal rods 222, to a ring shaped flame holder 220 at its downstream end. An additional, ring shaped flame holder 221 is attached, via thin rods 223, to the outer combustor wall in the vicinity of the downstream end of the centerbody 205. The flame holder 220 can be moved relative to the flame holder 221 by moving the centerbody 205 along the combustor in the directions of arrows 225.

Figure 21:
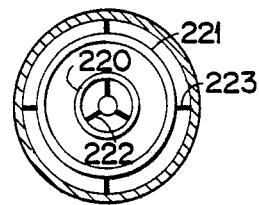
FIG. 21 is an end view of the two ring type flame holders shown in FIG. 20.

An end view of the two ring shaped flame holders 220 and 221 shown in FIG. 20 is provided in FIG. 21.

The centerbody in the embodiment of FIG. 20 contains fuel injection orifices 206 which supply part or all of the required fuel. All or part of the needed fuel can be also supplied through an additional set of orifices 203 located in the outer combustor wall in the vicinity of the flame holder 221. Air for combustion is supplied through an inlet pipe 204 into an upstream decoupler 213 which is connected to the upstream end of the combustor tube 202.

Unsteady combustion occurs inside vortices 209 which are transported by the flow inside shear layers 210 and 211 which form downstream of the ring-like flame holders 220 and 221. These unsteady combustion processes excite longitudinal acoustic oscillations in the combustor tube upstream of the ring-like flame holders 220 and 221. The frequency of these oscillations is determined by the length $L_c$ between the flame holders and the upstream decoupler 213. In the embodiment shown in FIG. 20 the length $L_c$ approximately equals half the wavelength of the excited acoustic oscillations whose frequency f is determined by Equation 5 above.

In the pulse combustor embodiments shown in FIGS. 18, 19 and 20, the frequency of pulsations can be changed by changing the length $L_c$ between the flame holders and the upstream decoupler 213. This can be accomplished by changing the length of the combustor tube 202 by moving the sleeve-type arrangement 214 along the directions given by arrows 226 and/or by changing the position of the flame holders which are located on the centerbody 205, by moving the centerbody 205 along the directions of arrows 225.

It is also to be understood that in the embodiment shown in FIGS. 18, 19 and 20, acoustic pulsations will not be restricted to the region upstream of the flame holders and they could also be excited, simultaneously, in the combustor tube section downstream of the flame holders, and/or in a system which is attached to the downstream end of combustor such as, for example, the processing chamber 12 considered in the present invention.

Additional means for controlling the range of acoustic frequencies which could be excited by the tunable pulse combustors embodiments shown in FIGS. 15–20 include: changing the diameter of the combustor tube, changing the diameters of the flame holders, and changing the ratios of the flame holder diameters to the combustor tube diameter. It is also to be understood that decreasing the combustor tube diameter will generally increase the magnitudes of the excited frequencies.

It is also to be understood that the pulse combustor embodiments shown in FIGS. 18, 19 and 20 can be modified without any adverse effects by replacing the decoupler 213 at their upstream end with a "hard termination" or acoustically closed end similar to the one shown at 215 at the upstream end of the tunable pulse combustor configuration shown in FIG. 16. In the modified configuration, the distance $L_c$ between the flame holders and the "hard wall" upstream termination will generally equal one quarter of the wavelength of pulsations whose frequency f will be given by Equation 6 above.

Figure 22:
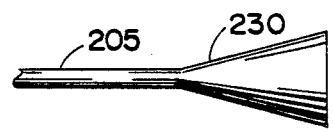
FIG. 22 illustrates a conical flame holder.

It will be understood that any geometric configuration or other means which produce interacting shear layers is considered a "flame holder" for purposes of the present invention. It will thus be understood that the disc or ring shaped flame holders shown in the embodiment of FIGS. 15–20 can be replaced by other types of flame holders such as a configuration where the centerbody or rod 205 terminates without a larger-diameter disk, a cross-shaped or other multi-rod configuration, a conical flame holder such as shown at 230 in FIG. 22, a "gutter" type flame holder, and the like. Similarly, the ring shaped flame holders can be replaced by flame holders having non-circular shapes such as, for example, diamond-like shapes.

The preferred embodiments of the present invention have been disclosed by way of example and it will be understood that other modifications may occur to those skilled in the art without departing from the scope and the spirit of the appended claims.

What is claimed is:

1. A frequency tunable pulse combustor, comprising:
   a combustion chamber;
   a rod extending into said combustion chamber;
   a disk shaped flame holder attached to an end of said rod for forming at least one reacting shear layer region which excites pulsations in said combustion chamber;
   a combustion zone operatively associated with said combustion chamber wherein a combustion reaction of fuel and air occurs in said shear layer region and heat is released to excite pulsations inside said tunable pulse combustor;
   a circular ring flame holder affixed to a wall of said combustion chamber for forming a second reacting shear layer region to excite pulsations in said combustor;
   a decoupler having an interfitting sleeve coaxial with said combustion chamber for supplying air into said combustion zone for said combustion reaction;
   fuel supply means for supplying fuel into said combustion zone for said combustion reaction;
   exhaust means for exhausting combustion by-products; and
   adjusting means for selectively changing the frequency of pulsations in said shear layer regions, thereby providing a selectively frequency tunable pulse combustor.

2. The frequency tunable pulse combustor of claim 1, wherein said adjusting means comprises means for axially translating said rod with respect to said combustion chamber.

3. The frequency tunable pulse combustor of claim 1, wherein said adjusting means comprises means for axially translating said decoupler with respect to said combustion chamber.

4. A frequency tunable pulse combustor, comprising:
a combustion chamber having a closed upstream end;
flame holder means for forming at least one reacting shear layer region which excites pulsations in said combustor;
a combustion zone operatively associated with said combustion chamber wherein a combustion reaction of fuel and air occurs and heat is released to excite pulsations inside said tunable pulse combustor;
air intake means positioned proximate said closed end for supplying air into said combustion zone for said combustion reaction;
fuel supply means for supplying fuel into said combustion zone for said combustion reaction;
exhaust means for exhausting combustion by-products; and
adjusting means for selectively varying the frequency of pulsations in tunable pulse combustor, thereby providing a selectively frequency tunable pulse combustor.

5. The frequency tunable pulse combustor of claim 4, wherein said adjusting means comprises means for axially translating said flame holder means with respect to said combustion chamber.

6. The frequency tunable pulse combustor of claim 4, wherein said adjusting means comprises means for axially translating said closed end of said combustion chamber with respect to said combustion chamber.

7. The frequency tunable pulse combustor of claim 4, wherein said flame holder means comprises a longitudinal rod and a flame holder attached to the downstream end of said rod.

8. The frequency tunable pulse combustor of claim 7, wherein said flame holder comprises a disk.

9. The frequency tunable pulse combustor of claim 7, wherein said flame holder comprises a cone.

10. The frequency tunable pulse combustor of claim 7, wherein said flame holder comprises a ring.

11. The frequency tunable pulse combustor of claim 7, wherein said flame holder is a first flame holder, and further comprising second flame holder means for forming a second shear layer region which excites pulsations in said combustor.

12. The frequency tunable pulse combustor of claim 11, wherein said second flame holder means comprises a circular ring flame holder affixed to the wall of said combustion chamber.

13. The frequency tunable pulse combustor of claim 11, wherein said adjusting means comprises means for axially translating said first flame holder means with respect to said second flame holder means.

14. An improved pulsating processing system for conducting a process in a pulsating environment, comprising:
a processing chamber for processing material;
means for introducing material to be processed into said processing chamber;
means operatively associated with said processing chamber for introducing a flow of reactants into said processing chamber to process material introduced into said processing chamber, said flow of reactants producing a reaction in said processing chamber;
means for exciting at least one natural acoustic mode in said processing chamber, said exciting means being operative about the frequency of a natural acoustic mode of said processing chamber;
tuning means operatively associated with said processing chamber and said exciting means for selecting the frequency of said exciting means about the frequency of said natural acoustic mode;
exhaust means for exhausting reaction by-products from said processing chamber; and
means for removing processed material from said processing chamber,
whereby material introduced into said processing chamber is subjected to acoustic pulsations about the frequency of said natural acoustic mode while the material is being processed in said processing chamber.

15. The pulsating processing system of claim 14, wherein said system is a heat transfer system.

16. The pulsating processing system of claim 15, wherein said heat transfer system is a heater.

17. The pulsating processing system of claim 15, wherein said heat transfer system is a boiler.

18. The pulsating processing system of claim 14, wherein said system is a chemical processing system.

19. The pulsating processing system of claim 18, wherein said chemical processing system is a calcining system.

20. The pulsating processing system of claim 18, wherein said material to be processed is a gas, and wherein said chemical processing system is a system for containing a gaseous chemical reaction wherein at least one of the reactants is a gas.

21. The pulsating processing system of claim 20, wherein said gas is flue gas from a combustion process, and wherein said reactants comprise chemicals for reacting with said flue gas.

22. The pulsating processing system of claim 14, wherein said system is a physical processing system.

23. The pulsating processing system of claim 22, wherein said physical processing system is a material drying system.

24. The pulsating processing system of claim 23, wherein said material drying system is a kaolin drying system.

25. The pulsating processing system of claim 23, wherein said material drying system is a food drying system.

26. The pulsating processing system of claim 14, wherein said natural acoustic mode is a longitudinal mode.

27. The pulsating processing system of claim 14, wherein said natural acoustic mode is a transverse acoustic mode.

28. The pulsating processing system of claim 14, wherein said natural acoustic mode is a three-dimensional acoustic mode.

29. The pulsating processing system of claim 14, wherein said exciting means and said tuning means comprises a tunable pulse combustor.

30. The pulsating processing system of claim 14, wherein said exciting means comprises means for modulating the flow of reactants introduced by said reactant introducing means, and said tuning means comprises means for controlling the frequency of modulation of said reactant modulating means.

31. The pulsating processing system of claim 30, wherein said modulating means comprises fuel flow modulating means.

32. The pulsating processing system of claim 14, wherein said reactant flow comprises a flow of fuel and air, and wherein said reaction is a combustion reaction.

33. The pulsating processing system of claim 14, wherein said exciting means comprises flame holder means for forming at least one reacting shear layer region which excites plusations in said processing chamber.

34. The pulsating processing system of claim 33, wherein said tuning means comprises means for axially translating said flame holder means.

35. The pulsating processing system of claim 33, wherein said flame holding means comprises a disk positioned in said processing chamber.

36. The pulsating processing system of claim 33, wherein said flame holding means comprises a cone positioned in said processing chamber.

37. The pulsating processing system of claim 33, wherein said flame holding means comprises an annular ring positioned in said processing chamber.

38. The pulsating processing system of claim 33, wherein said flame holding means is a first flame holding means, and further comprising a second flame holding means for forming a second reacting shear layer region which excites pulsations in said processing chamber.

39. The pulsating combustion system of claim 38, wherein said second flame holding means comprises an annular ring positioned inside said processing chamber.

40. The pulsating processing chamber of claim 38, wherein a cross-sectional dimension of said processing chamber is greater than a corresponding cross-sectional dimension of said reactant flow introducing means, thereby forming said second reacting shear layer region inside said processing chamber.

41. A method of processing material by subjecting the material in a processing chamber to a pulsating processing environment, comprising the steps of:
   (1) introducing material to be processed into said processing chamber;
   (2) providing a pulsating flow of heated gases at a selected frequency to said processing chamber to process said material; and
   (3) tuning said frequency to a frequency about a natural acoustic mode of said processing chamber,
   whereby material introduced into the processing chamber is subjected to acoustic pulsations about the frequency of a natural acoustic mode of the processing chamber while the material is being processed in the processing chamber.

42. The method of claim 41, further comprising the step of optimizing the processing of material in said processing chamber by tuning to a frequency which optimizes a particular parameter for a given process.

43. The method of claim 42, wherein the optimized parameter is the final temperature of the processed material.

44. The method of claim 42, wherein the optimized parameter is the final moisture content of the processed material.

45. The method of claim 42, wherein the optimized parameter is the amplitude of pulsations inside the processing chamber to reduce noise level.

46. The method of claim 42, wherein the optimized parameter is the final chemical composition of the processed material.

* * * * *